US009977245B2

(12) United States Patent
Mack et al.

(10) Patent No.: US 9,977,245 B2
(45) Date of Patent: May 22, 2018

(54) AUGMENTED REALITY EYEWEAR

(71) Applicant: LAFORGE Optical, Inc., Venice, CA (US)

(72) Inventors: Corey Mack, Venice, CA (US); William Kokonaski, Gig Harbor, WA (US)

(73) Assignee: LAFORGE OPTICAL, INC., Los Angeles, CA (US)

(*) Notice: Subject to any disclaimer, the term of this patent is extended or adjusted under 35 U.S.C. 154(b) by 0 days. days.

(21) Appl. No.: 15/055,151

(22) Filed: Feb. 26, 2016

(65) Prior Publication Data
US 2016/0252728 A1 Sep. 1, 2016

Related U.S. Application Data

(60) Provisional application No. 62/121,912, filed on Feb. 27, 2015, provisional application No. 62/121,918, (Continued)

(51) Int. Cl.
G02C 1/00 (2006.01)
G02B 27/01 (2006.01)
(Continued)

(52) U.S. Cl.
CPC ..... *G02B 27/0172* (2013.01); *G02B 27/0176* (2013.01); *G06F 3/147* (2013.01);
(Continued)

(58) Field of Classification Search
CPC .............. G02B 27/0172; G02B 27/017; G02B 27/0176; G02B 27/283; G02B 26/105; G02C 11/10
(Continued)

(56) References Cited

U.S. PATENT DOCUMENTS 5,299,063 A * 3/1994 Fritz ................. G02B 27/0172
345/7
5,822,127 A 10/1998 Chen et al.
(Continued)

FOREIGN PATENT DOCUMENTS

WO 2014/209244 12/2014

OTHER PUBLICATIONS

PCT International Search Report and Written Opinion issued in International Application No. PCT/US2016/019875 dated Apr. 29, 2016.
(Continued)

Primary Examiner — Hung Dang
(74) Attorney, Agent, or Firm — Greenberg Traurig, LLP; Chinh H. Pham; Todd C. Basile

(57) ABSTRACT

Eyewear for displaying a virtual image comprising a visor for placement in a field of vision of a wearer, a light source in optical communication with the visor, and a reflective surface situated within the visor and configured to direct light projected into the visor from the light source toward at least one eye of the wearer for display as a virtual image. Another eyewear comprising a visor configured to display a virtual image in a field of vision of a wearer, a frame for supporting the visor, and electronics for operating the eyewear, the electronics being integrally embedded within one or more components of the frame.

31 Claims, 17 Drawing Sheets

Related U.S. Application Data filed on Feb. 27, 2015, provisional application No. 62/121,928, filed on Feb. 27, 2015, provisional application No. 62/130,736, filed on Mar. 10, 2015, provisional application No. 62/130,742, filed on Mar. 10, 2015, provisional application No. 62/130,747, filed on Mar. 10, 2015, provisional application No. 62/130,751, filed on Mar. 10, 2015, provisional application No. 62/132,330, filed on Mar. 12, 2015.

(51) Int. Cl.
*G09G 5/373* (2006.01)
*H04N 7/18* (2006.01)
*G06F 3/147* (2006.01)
*G02C 11/00* (2006.01)

(52) U.S. Cl.
CPC ............. *G09G 5/373* (2013.01); *H04N 7/185* (2013.01); *G02B 2027/013* (2013.01); *G02B 2027/0138* (2013.01); *G02B 2027/0178* (2013.01); *G02C 11/10* (2013.01); *G09G 2340/12* (2013.01); *G09G 2340/14* (2013.01); *G09G 2370/16* (2013.01)

(58) Field of Classification Search
USPC .................... 351/158, 41; 359/631, 633, 630
See application file for complete search history.

(56) References Cited

U.S. PATENT DOCUMENTS

| | | |
|---|---|---|
| 6,157,353 A | 12/2000 | Song et al. |
| 7,158,095 B2 | 1/2007 | Jenson et al. |
| 7,404,636 B2 | 7/2008 | Blum et al. |
| 8,767,305 B2 | 7/2014 | Spitzer et al. |
| 9,229,248 B2 | 1/2016 | Kokonaski et al. |
| 2009/0195749 A1 | 8/2009 | Blum et al. |
| 2009/0251660 A1 | 10/2009 | Figler et al. |
| 2014/0254024 A1 | 9/2014 | Hiraide et al. |
| 2015/0219899 A1 | 8/2015 | Mack et al. |

OTHER PUBLICATIONS

PCT International Search Report issued in International Application No. PCT/US2016/017336 dated Jul. 7, 2016.
PCT International Search Report issued in International Application No. PCT/US2016/019857 dated May 6, 2016.

\* cited by examiner

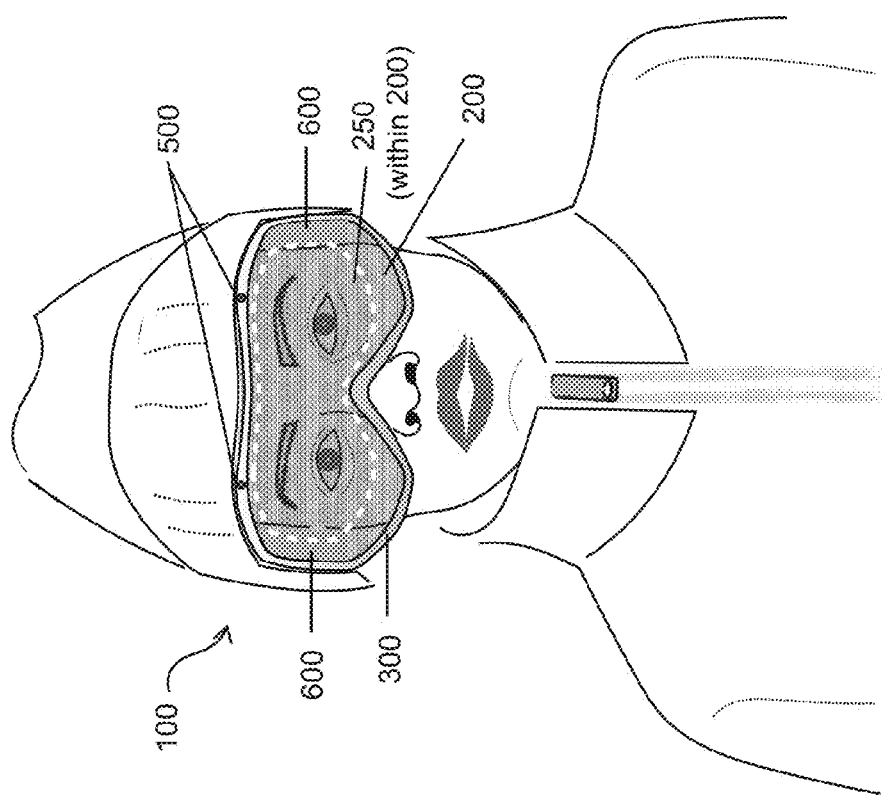

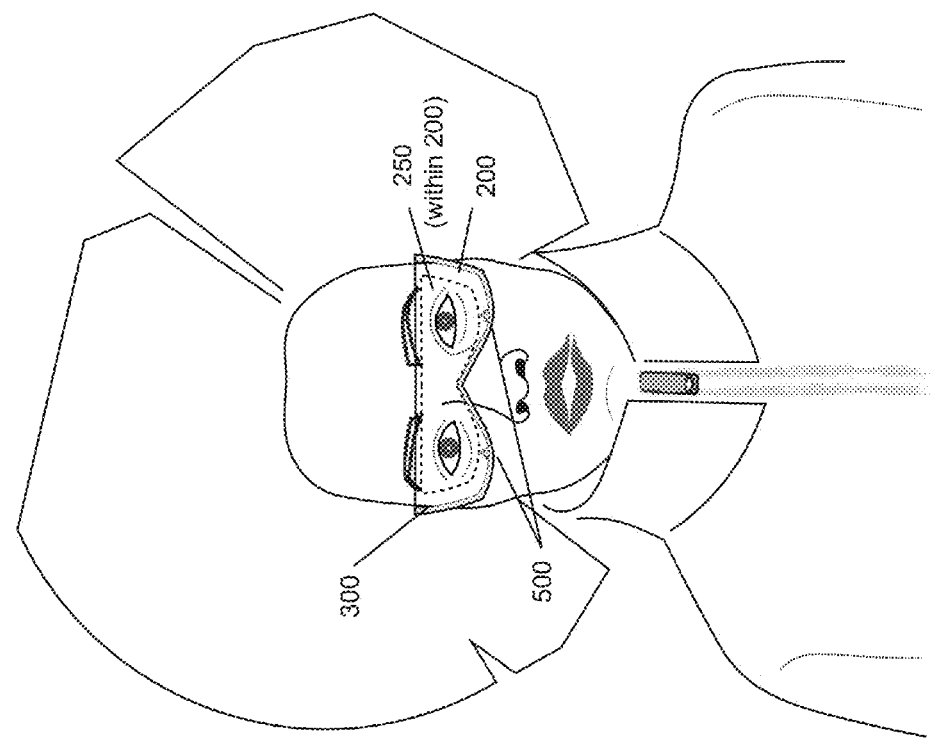
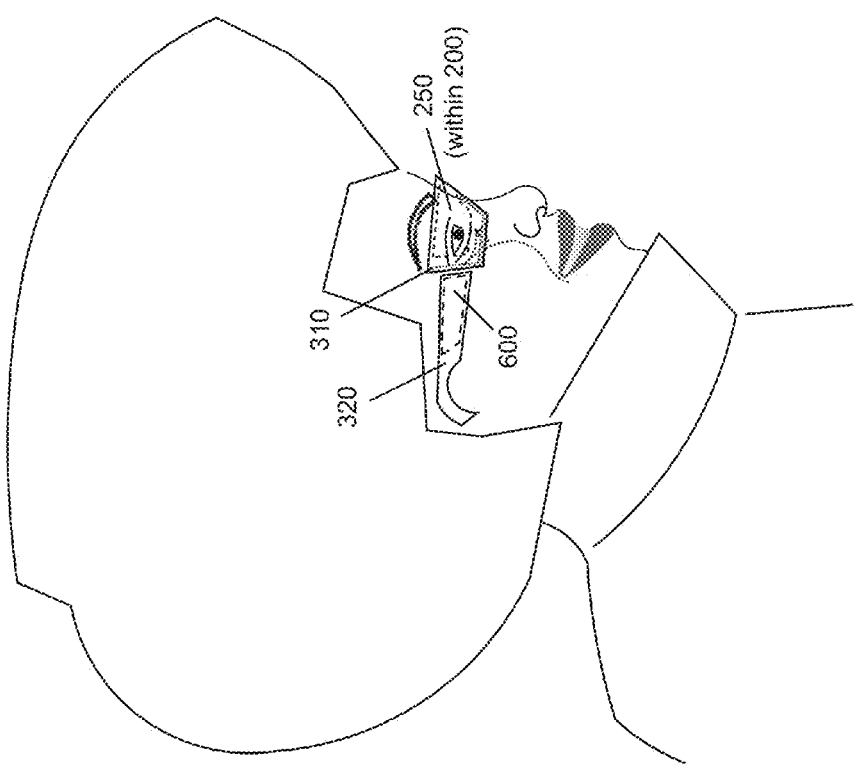

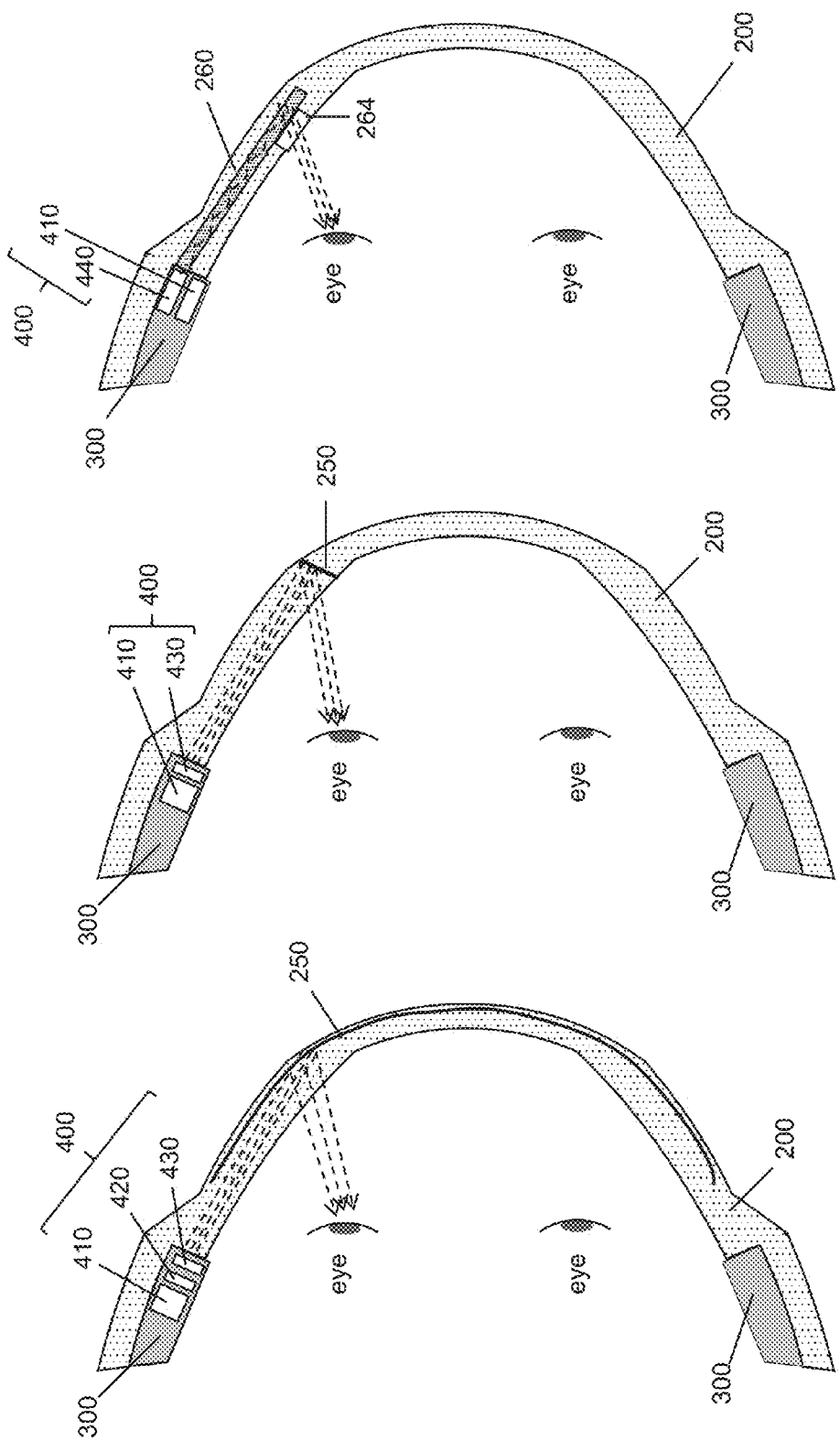

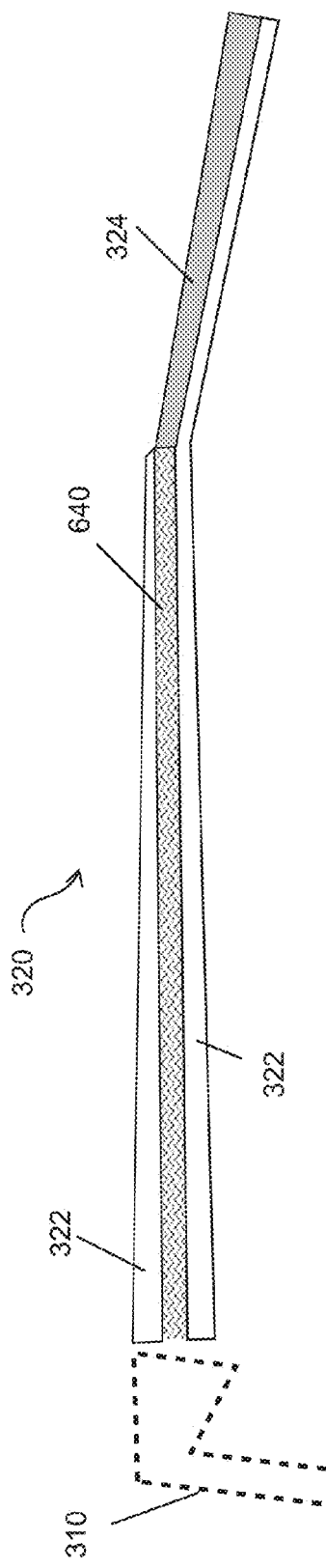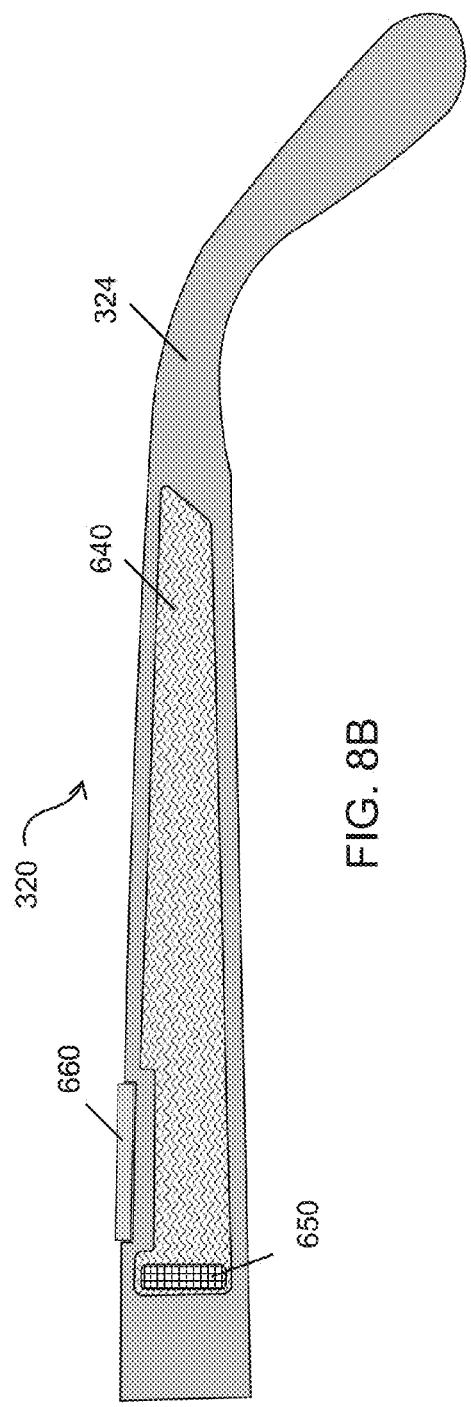

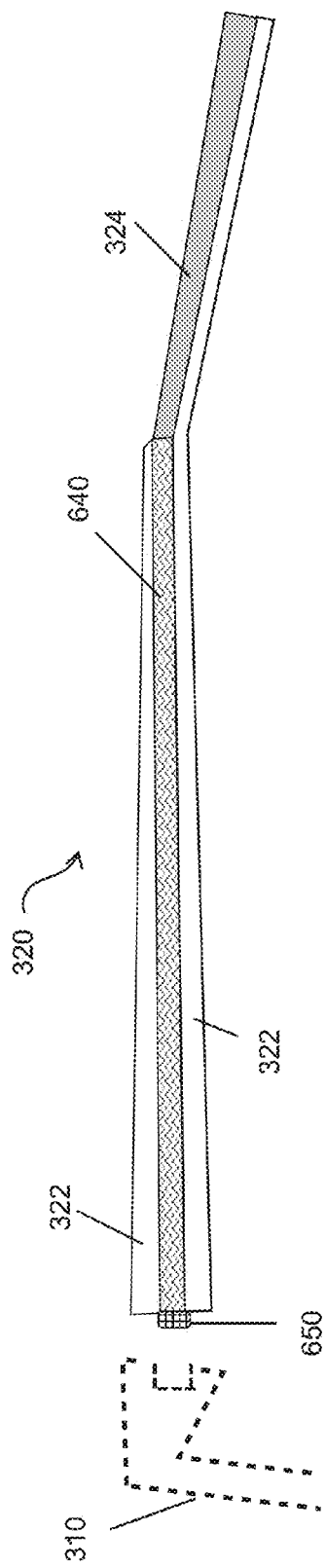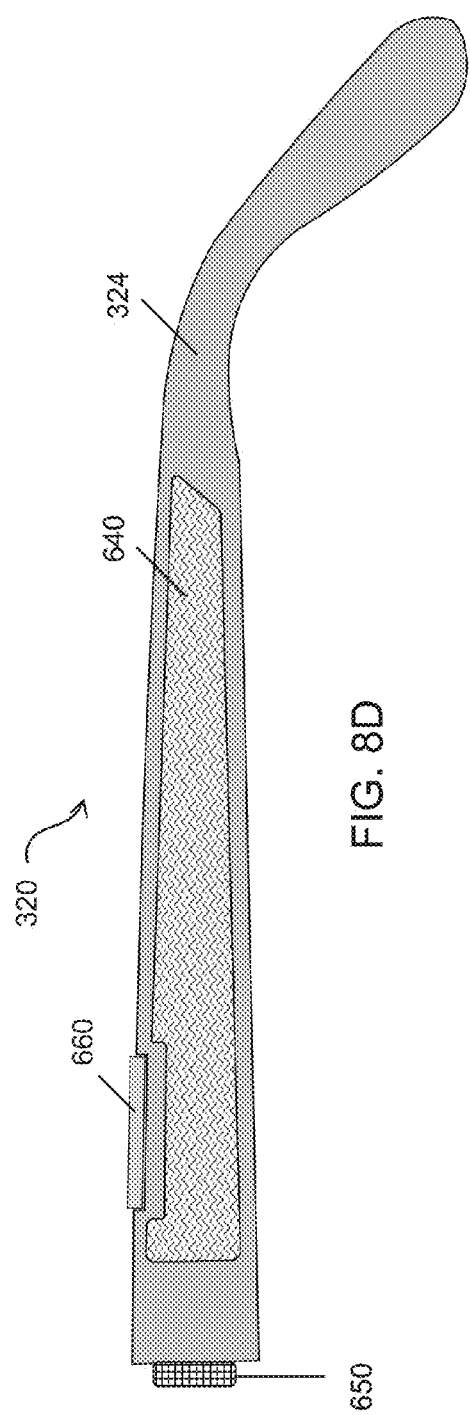
FIG. 8C
FIG. 8D

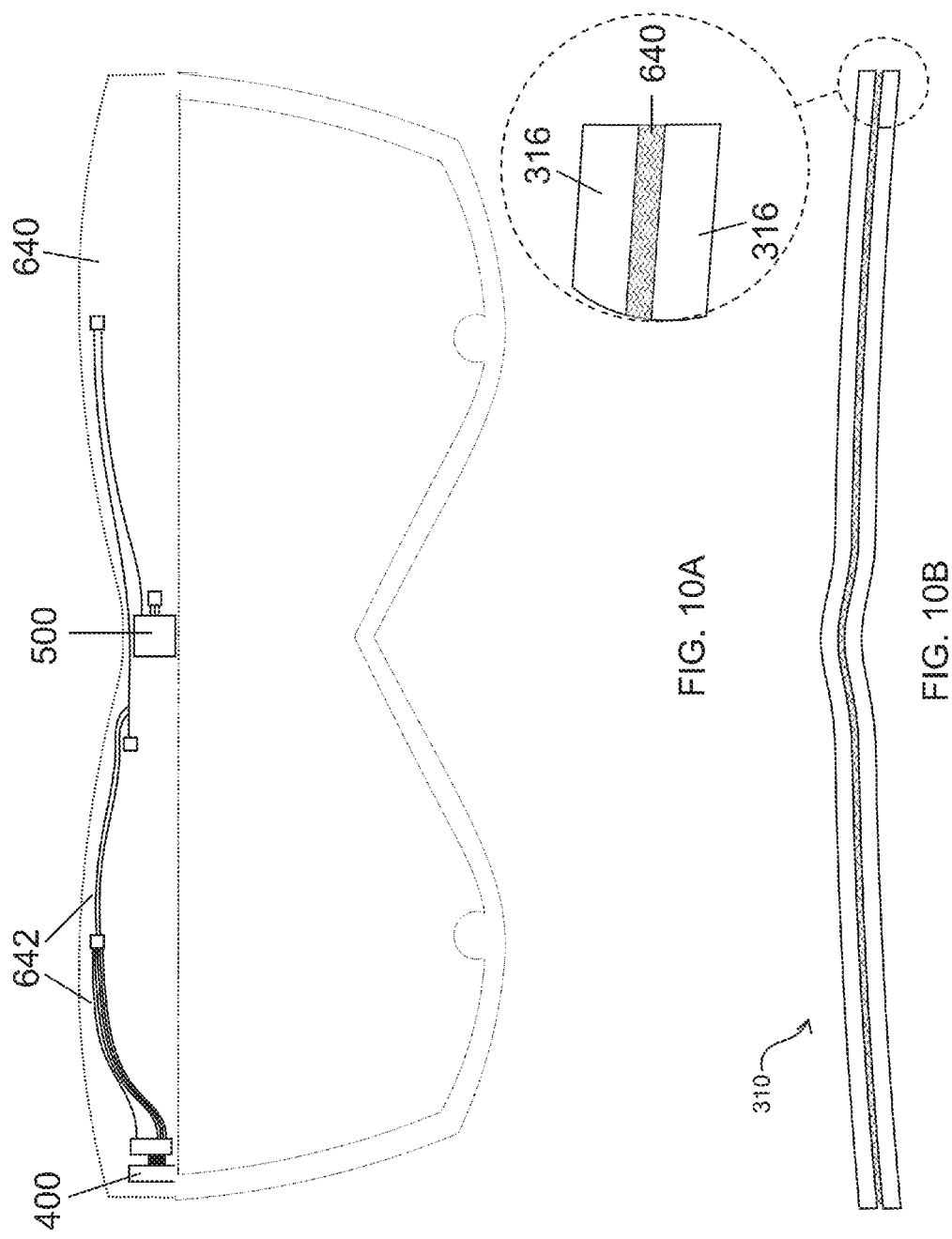

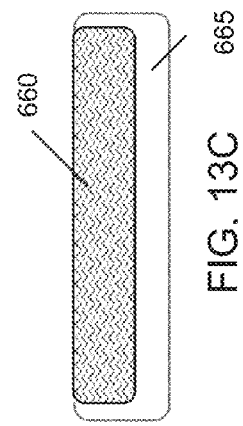
FIG. 13B
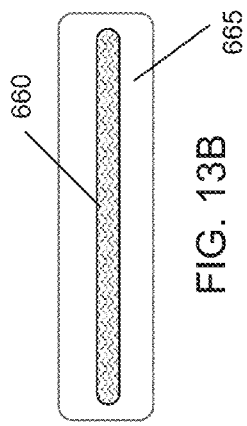
FIG. 13C
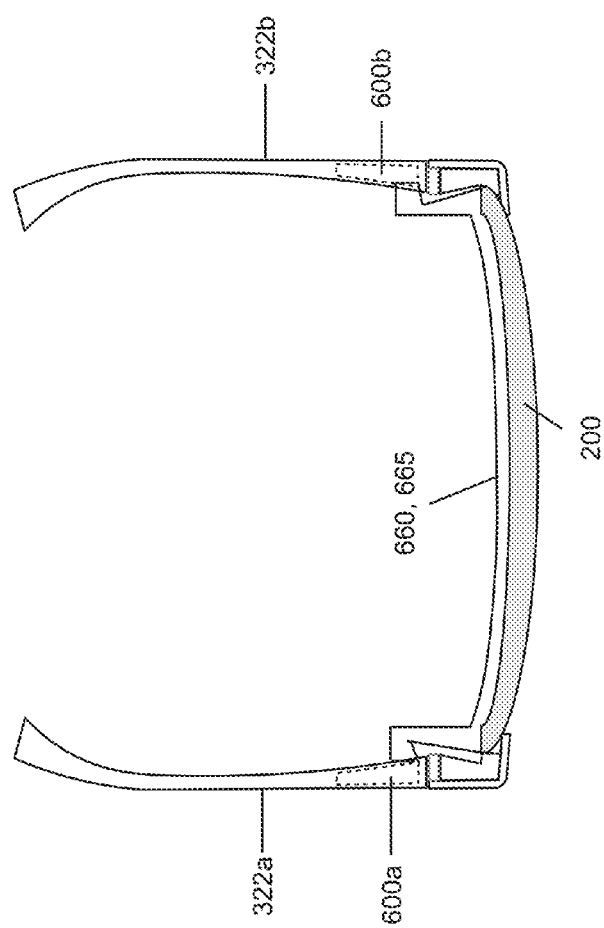
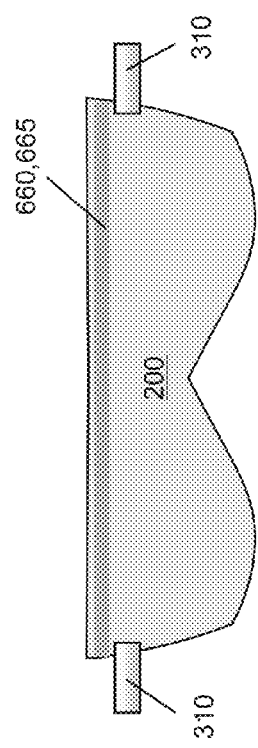
FIG. 13A

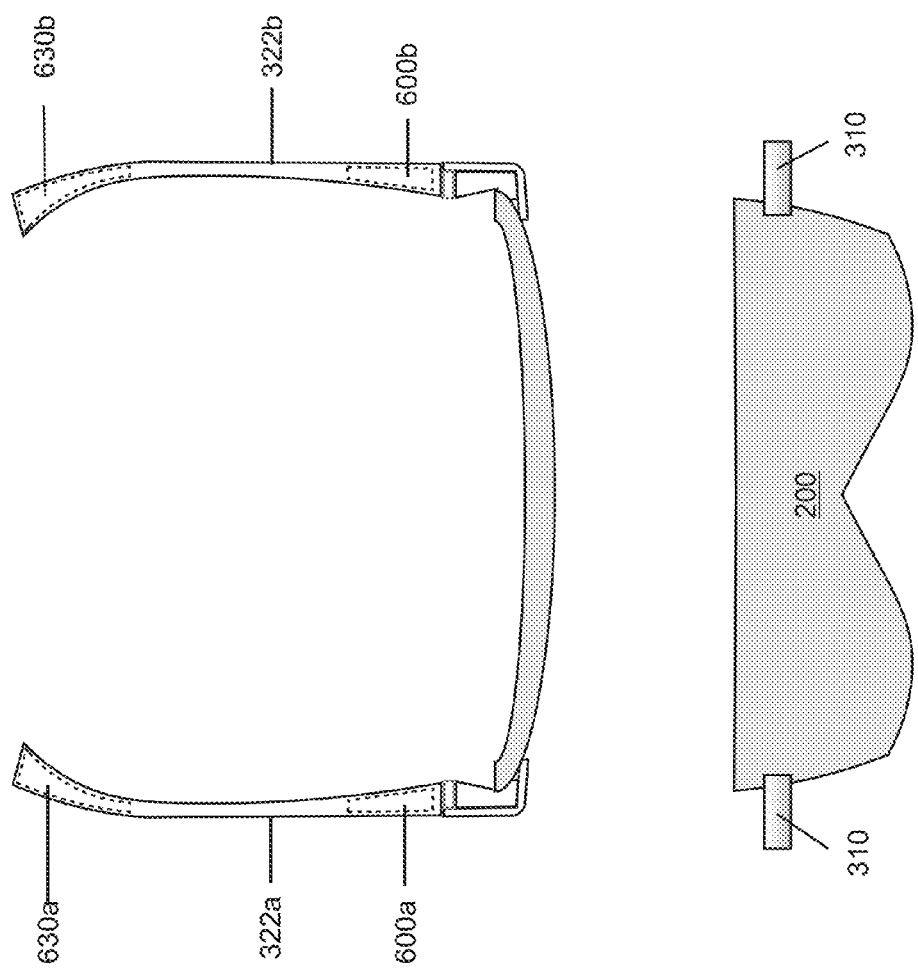

AUGMENTED REALITY EYEWEAR

RELATED U.S. APPLICATIONS

This application claims priority to U.S. Provisional Patent Application Ser. No. 62/121,912, filed Feb. 27, 2015; U.S. Provisional Patent Application Ser. No. 62/121,918, filed Feb. 27, 2015; U.S. Provisional Patent Application Ser. No. 62/121,928, filed Feb. 27, 2015; U.S. Provisional Patent Application Ser. No. 62/130,736, filed Mar. 10, 2015; U.S. Provisional Patent Application Ser. No. 62/130,742, filed Mar. 10, 2015; U.S. Provisional Patent Application Ser. No. 62/130,747, filed Mar. 10, 2015; U.S. Provisional Patent Application Ser. No. 62/130,751, filed Mar. 10, 2015; and U.S. Provisional Patent Application Ser. No. 62/132,330, filed Mar. 12, 2015; each of which is hereby incorporated herein by reference in its entirety for all purposes.

TECHNICAL FIELD

The present invention relates to augmented reality systems, and more particularly, eyewear configured for displaying virtual images in a user's field of vision.

BACKGROUND

Existing augmented reality eyewear suffers from a number of disadvantages. In one aspect, many systems project an image with a focal point very close to the user's eye, causing a user to have to repeatedly shift its focus from close to far to view the image and the surrounding environments, respectively. This can be uncomfortable and distracting to the user. In another aspect, many systems suffer from unpleasant aesthetics, such as thick lenses or protruding hardware. In particular, in an effort to minimize the profile of eyewear frames, some systems provide all or a majority of their image generating hardware within the eyewear lenses. This may make the lenses very thick and heavy. Thicknesses of 5 mm, or even 7 mm-10 mm are not uncommon. Other systems, such as the Epson Moverio BT-200, take an opposite approach, housing all or a majority of image generating hardware in the eyewear frame. Others still, like the Vuzix M100 and Google Glass, take a more modular approach, by housing all the electronics and optics in a device that may attach to conventional eyewear. While this may provide for thinner lenses, the frame may be visually conspicuous. This may make the user feel self-conscious and resistant to wearing the eyewear in public.

In light of these issues, it would be desirable to provide an augmented reality system having an aesthetically pleasing profile approaching that of traditional ophthalmic eyewear, and configured to overlay images at focal points associated with a user's normal field of vision.

SUMMARY OF THE INVENTION

The present disclosure is directed to eyewear for displaying a virtual image in a field of vision of a wearer. The eyewear may include a visor for placement in a field of vision of a wearer of the eyewear. A light source may be provided in optical communication with the visor. A reflective surface may be included within the visor, and is configured to direct light projected into the visor from the light source toward the corresponding eye of the wearer for display as a virtual image.

In various embodiments, the visor may include a first body section and a second body section. The body sections may be coupled to form an internal interface within the visor. The reflective surface, in an embodiment, may be situated along the internal interface within the visor.

The reflective surface, in various embodiments, may focus the light projected into the visor at a location beyond the reflective surface. In an embodiment, the reflective surface may have a concave curvature. In another embodiment, the reflective surface may be planar. In some embodiments, the reflective surface may be angled to direct the light projected into the visor towards a corresponding eye of the wearer. In other embodiments, multiple reflective surfaces may be arranged within the visor to form a light guide. The light may reflect or refract off of each of the multiple reflective surfaces one or more times before being directed towards the eye of the wearer.

The visor, in various embodiments, may further include at least one of a transform optic, a focusing optic, an optical waveguide, and a collimating optic embedded within the visor. Additionally or alternatively, in various embodiments, at least one of a transform optic, a focusing optic, an optical waveguide, and a collimating optic may be situated between the light source and the visor.

The light source, in various embodiments, may be in optical communication with an edge of the visor. In some embodiments, the light source may be oriented towards the edge of the corresponding visor. In other embodiments, an optical element may be provided for directing the light from the light source towards the edge of the visor.

The eyewear, in various embodiments, may further include an image sensor configured to capture at least one of images, video, and light readings from a surrounding environment. The image sensor, in some embodiments, may lack direct optical communication with an area in front of the eyewear. A second reflective surface may be provided within the visor to direct ambient light from the surrounding environment through the visor and towards the image sensor. In an embodiment, the second reflective surface may be a reverse side of the reflective surface used for displaying the virtual image.

In another aspect, the present disclosure is directed to another eyewear for displaying a virtual image in a field of vision of a wearer. The eyewear may include a visor configured to display a virtual image in a field of vision of the wearer, a frame for supporting the visor, and electronics for operating the eyewear. The electronics may be integrally embedded within one or more components of the frame.

The electronics, in various embodiments, may be arranged on one or more printed circuit boards. The one or more frame components, in some embodiments, may include one or more shells molded over the electronics such that they are integrally embedded there within. Additionally or alternatively, in some embodiments, the one or more frame components may include one or more shells laminated onto the electronics such that they are integrally embedded there within.

The frame, in various embodiments, may be a spectacles frame. The electronics, in various embodiments, may be integrally embedded within a first temple and a second temple of the spectacles frame. In some embodiments, the integrally embedded electronics in the first temple are in electrical communication with the integrally embedded electronics in the second temple. In an embodiment, the electrical communication may extend through a frame front of the spectacles frame. In another embodiment, the frame may be rimless, and the electrical communication between the electronics of the temples may extend through a crossover electrical connection. Additionally or alternatively, electronics in the first and second temples may be in wireless communication. One or more components of the frame, in an embodiment, may be coupled with other components in the frame in a modular fashion. The frame, in various other embodiments, may be a goggles frame or a helmet.

BRIEF DESCRIPTION OF DRAWINGS

For a more complete understanding of this disclosure, reference is now made to the following description, taken in conjunction with the accompanying drawings, in which:

FIG. 2 illustrates a front view of goggle-like augmented reality visor eyewear, in accordance with one embodiment of the present disclosure;

FIGS. 3A and 3B illustrate side and front views of spectacle-like augmented reality visor eyewear, in accordance with one embodiment of the present disclosure;

FIGS. 6A-6C depict schematic views of pathways along which image light may be directed sideways from an image projection system into virtual image visor of augmented reality eyewear, in accordance with embodiments of the present disclosure;

FIGS. 8A-8D illustrate frame temples having integrally embedded electronics, in accordance with embodiments of the present disclosure;

FIGS. 10A-10C illustrate a frame front PCB board, in accordance with embodiments of the present disclosure;

FIGS. 13A-13C depict rimless augmented reality visor eyewear having a crossover electrical connection between electronics of frame temples, in accordance with embodiments of the present disclosure; and FIG. 14 depicts rimless augmented reality visor eyewear having a wireless connection between electronics of frame temples, in accordance with embodiments of the present disclosure.

DESCRIPTION OF SPECIFIC EMBODIMENTS

Figures 1A, 1B:
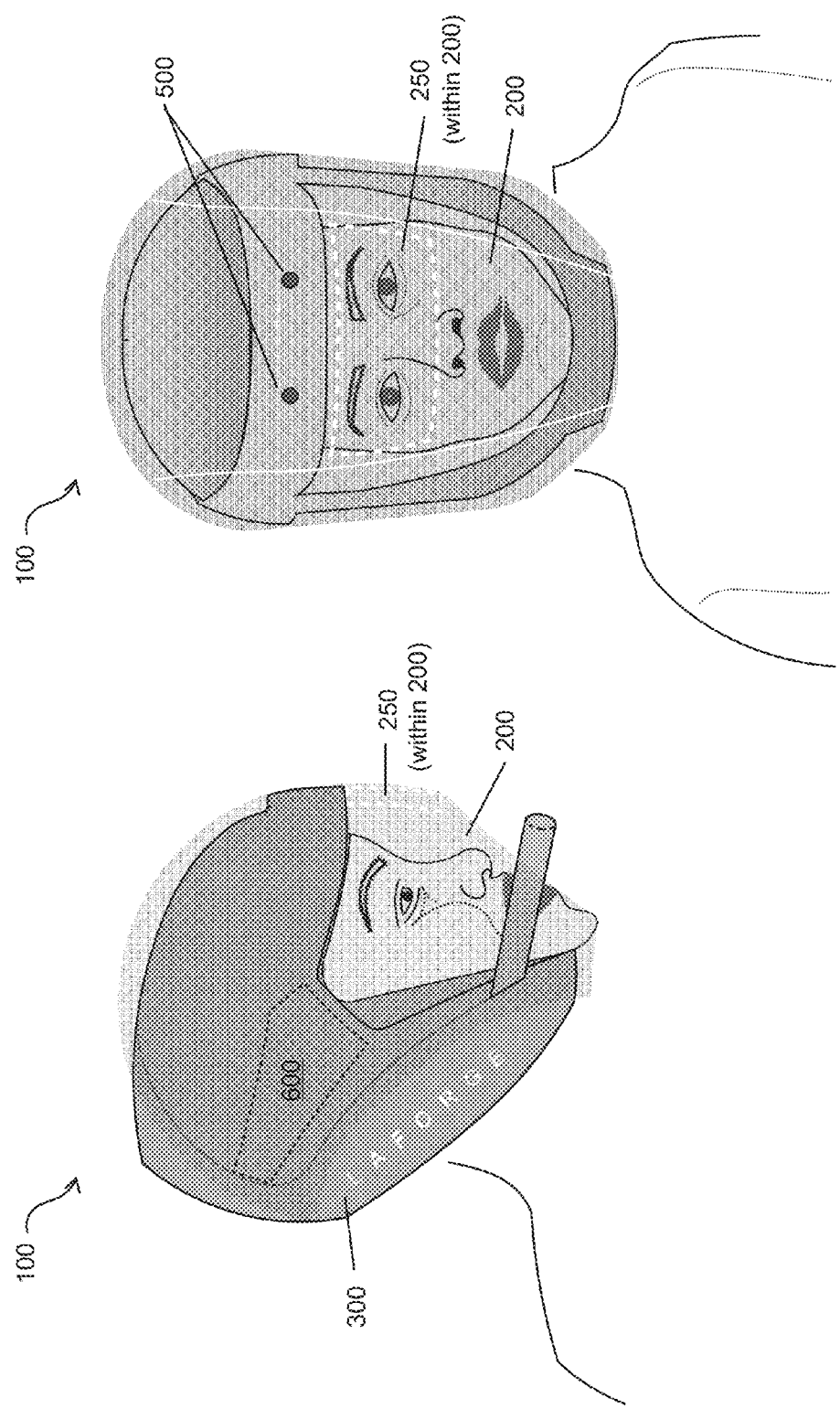
FIGS. 1A and 1B illustrate side and front views of helmet-like augmented reality visor eyewear, in accordance with one embodiment of the present disclosure.

Embodiments of the present disclosure generally provide augmented reality eyewear 100 for displaying a virtual image in a field of vision of a user. A virtual image is formed when incoming light rays are focused at a location beyond the source of the light rays. This creates the appearance that the object is at a distant location, much like a person's image appears to be situated behind a mirror. In some cases, the light rays are focused at or near infinity. Augmented reality eyewear 100 can enhance a user's interaction with its environment by projecting a virtual image(s) in a user's field of vision, thereby overlaying useful images or information over what the user would naturally see. Embodiments of augmented reality eyewear 100 may be used standalone, or with a companion device such as a smartphone or other suitable electronic device. In some such embodiments, augmented reality eyewear 100 may process information from the mobile phone, a user, and the surrounding environment, and displaying it in a virtual image to a user.

FIGS. 1A-1B, 2, and 3A-3b illustrate representative embodiments of augmented reality eyewear 100. Augmented reality eyewear may generally include a virtual image visor 200, a frame 300, an image projection system 400, an image capture system 500, and electronics 600. Visor 200, in various embodiments, is a lens with a planform suitable for spanning at least an area in front of both of the wearer's eyes. Generally speaking, frame 300 may secure and position visor 200 in front of a wearer's eyes, and image projection system 400 may generate and project light containing a real image ("image light") into visor 200, where it is manipulated for display to the wearer as a virtual image. Light from the surrounding environment may be collected by optics within visor 200 and directed to image capture system 500 for capture of image, video, or light data. Electronics 600 may control the display of the virtual images to the wearer using, in some embodiments, information provided by one or more sensors and/or devices incorporated in eyewear 100 or provided by a companion device 110 (not shown), such as a mobile phone. Electronics 600 may further control image capture system 500, if equipped.

With reference first to FIGS. 1A and 1B, eyewear 100, in an embodiment, may take the form of a helmet 300 equipped with a visor 200. One or more reflective surface 250 may be provided within the body of visor 200 for manipulating image light projected into visor 200 by image projection system 400 for display as a virtual image to the wearer. Electronics 500, in an embodiment, may be packaged within helmet 300. Helmet eyewear 100 may be configured for use in any number of applications including, without limitation, by football players, pilots, racecar or motorcycle drivers/riders, first responders, law enforcement, and military operators, amongst other suitable applications.

Referring now to FIG. 2, eyewear 100, in another embodiment, may take the form of goggles having a frame 300 for supporting visor 200 on the wearer's face. One or more reflective surface 250 may be provided within the body of visor 200 for manipulating image light projected into visor 200 by image projection system 400 for display as a virtual image to the wearer. Electronics 500 may be packaged in a frame 300 which, in some embodiments, may be provided with sufficient depth behind visor 200 for housing electronics 500 in any suitable fashion. An elastic strap may be provided, in an embodiment, for securing frame 300 to the wearer's head. Goggle eyewear 100 may be configured for use in any number of suitable applications including, without limitation, skiing, water sports, motorcycle riding, law enforcement, and military operators, amongst other suitable applications.

Referring now to FIGS. 3A and 3B, eyewear 100, in yet another embodiment, may take the form of spectacles having a frame 300 for supporting visor 200 on the wearer's face. One or more reflective surface 250 may be provided within the body of visor 200 for manipulating image light projected into visor 200 by image projection system 400 for display as a virtual image to the wearer. Electronics 500 may be packaged in any one or combination of frame 300 components, such as frame front 310 and frame arms (also known as temples) 320. Spectacle eyewear 100 may be configured for use in any number of suitable applications including, without limitation, daily-life activities such as walking or driving, by tourists, video gamers, and workers in the construction and manufacturing industries, amongst other suitable applications.

Of course, above-described the embodiments of eyewear 100 are merely illustrative, and the present application is not intended to be limited to any particular shape or size visor 200, and to any particular coupling or integration of visor 200 with any particular type of frame 300.

Virtual Image Visor 200

Figure 4C:
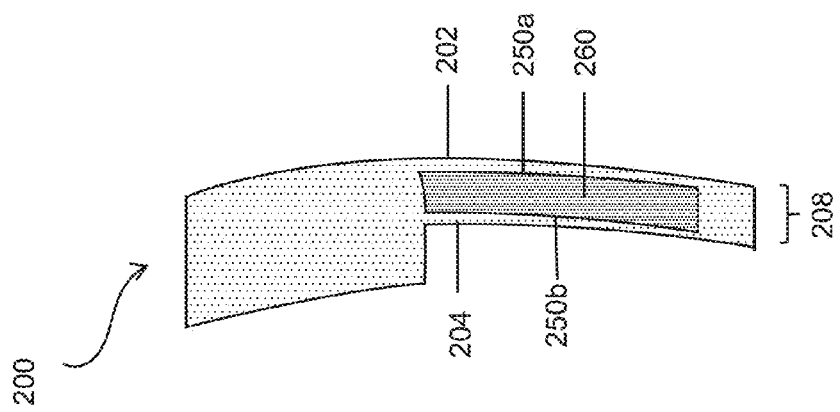
FIGS. 4A-4C depict side cutaway views of a virtual image visor having internal reflective surface(s), in accordance with embodiments of the present disclosure.
Figure 4B:
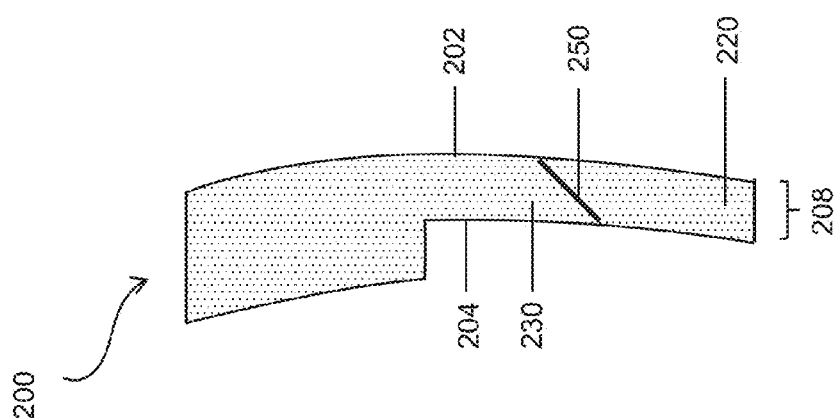
Figure 4A:
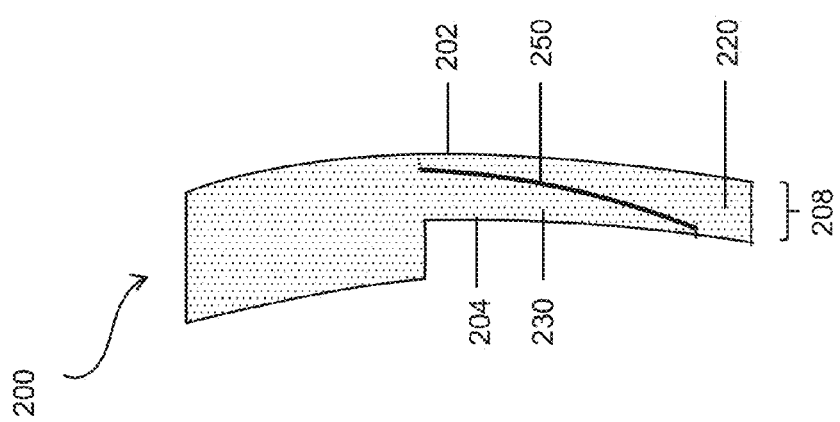

FIGS. 4A-4C illustrate side cross-sectional views of various embodiments of visor 200. Visor 200 of augmented reality eyewear 100 may include a front surface 202, a back surface 204, an edge 206, and a body 208 defining a thickness of visor 200. In various embodiments, body 208 may be formed of two or more body sections 220, 230.

First body section 220, in various embodiments, may define a front portion of visor 200. Accordingly, first body section 220 may define at least a portion of, or potentially all of, front surface 202 and edge 206, as shown. First body section 220 may further include a surface 222 on an opposing side from front surface 202.

Second body section 230, in various embodiments, may define a rear portion of visor 200. Accordingly, second body section 230 may define at least a portion of, or potentially all of, back surface 204 and edge 206, as shown. Second body section 230 may further include a surface 232 on an opposing side from back surface 204. Surface 232, in various embodiments, may be shaped to provide a flush fit with surface 222 of first body section 220, thereby defining an interface 210 between first body section 220 and second body section 230.

In various embodiments, one or more of body sections 220, 230 may be provided with different indices of refraction. In both configurations, ambient light entering visor 200 at a substantially normal angle of incidence may be allowed to pass through to the wearer's eye, thereby allowing the wearer to see the surrounding environment as he/she normally would with traditional eyewear. However, in embodiments of visor 200 having differing indices of refraction in body sections, light striking the interface(s) between body sections at shallow or oblique angles of incidence may be reflected back into the respective body section from which it came. Visor 200 can thus be configured to receive image light from image projection system 400 and redirect it towards the wearer's eye in a manner suitable to project a corresponding virtual image in the wearer's field of view.

Visor 200 may additionally or alternatively be provided with one or more reflectors 250. Reflector 250, in various embodiments, may be included in embodiments of visor 200 having body sections with substantially similar refractive indices, as well as those with differing refractive indices.

Reflector 250, in various embodiments, may include a material having reflective properties such as, without limitation, silver, nickel, aluminum, various dielectric stack materials including metal oxides, and glass. In some embodiments, reflector 250 may take the form of silver sputtered or evaporated coatings, dielectric stacks, silver coatings titanium coatings, chromium coatings, nickel coatings, and aluminum coatings. Reflector 250 may include a coating(s) of such material on an internal surface (or surfaces) of visor 200. For example, reflector 250 may include a coating(s) of reflective material on any one or combination of internal surfaces 222, 232 within visor body 208. In another embodiment (not shown), reflector 250 may include a mirror or other discrete reflective object. In various embodiments, the reflective material may be substantially transparent so as to maximize an amount of ambient light from the surrounding environment to penetrate visor 200 and reach the wearer's eye. One of ordinary skill in the art may recognize, in light of and within the scope of the present disclosure, other suitable equivalents.

Reflector 250, in various embodiments, may be configured for redirecting image light towards the wearer's eye for generating a corresponding virtual image. Additionally or alternatively, reflector 250 may be configured for vectoring image light within visor body 208 towards a location or locations from which it is ultimately directed towards the wearer's eye. In this context, one or more reflectors 250 may be positioned to serve as a light guide.

Reflector 250 may be of any size, shape, and position within visor 200 suitable for these purposes. As shown in FIG. 4A, some embodiments of reflective surface 250 may have a curved shape. While shown as covering most of the diameter of visor 200 in this particular embodiment, it should be appreciated that other embodiments of reflector 250 may span any suitable portion of visor 200. For example, in some embodiments, reflective surface 250 may span substantially the entire diameter of visor 200. Such a configuration may provide for maximum reflection of image light through back surface 204. In other embodiments, reflective surface 250 may span a lesser area of visor 200. Such a configuration may provide for ambient light to pass uninterrupted through portions of visor 200 situated around reflective surface 250, thereby enhancing vision clarity of the surrounding environment. One of ordinary skill in the art will recognize an appropriate size of reflective surface 250 for a given application. As shown, reflective surface 250 is provided with a substantially concave shape. Such a configuration, in some embodiments, may allow for receiving image light from any number of angles and directing it back out along a central axis, as later shown in FIG. 5A.

As shown in FIG. 4B, other embodiments of reflective surface 250 may be substantially planar. In the example shown here, reflective surface 250 is positioned near a center of visor 200 and canted at a 45° angle toward edge 206. As configured, reflector 250 may receive image light transmitted laterally through visor body 208 and redirect it 90° toward the wearer's eye, as later shown in FIG. 5B. Of course, reflector 250 could be placed anywhere within visor 200 and with any suitable angle for achieving similar functionality.

Referring to FIG. 4C, in various other embodiments, multiple reflective surfaces may be arranged within visor 200 to form a virtual image pane 260. In one such embodiment, reflective surfaces 250a, 250b may define a wave guide 262 of virtual image pane 260 configured to guide light from image projection system 400. Reflective surfaces 250a, 250b may be configured to manipulate image light projected by image projection system 400 such that the image is focused at a distance beyond visor 200 for display as a virtual image, as later shown in FIG. 5C. In particular, image light introduced into virtual image pane 260 may reflect or refract one or more times between reflective surfaces 250a and 250b to transform the real image into a virtual image.

It should be noted that in FIGS. 4A-4C, lines are provided to show an example location of surface 222 and a representative position of reflective surface 250 thereon; however, these lines, in various embodiments, would not necessarily be visible to the naked eye in a finished product. It should be further recognized that the specific configurations depicted in FIGS. 4A-4C are merely illustrative examples, and that reflective surface(s) 250 may be provided in visor 200 in any number of suitable shapes, sizes, and positions for directing image light towards a wearer's eye for display as a virtual image.

Visor 200, in an embodiment, may include a protective coating to prevent scratches or abrasions. Visor 200 may also be manufactured so as to be colored, tinted, reflective, reduced glare, or polarized, for increased comfort in bright environments. Visor 200 may also be a transition lens, configured to transition between various states of transparency depending on the brightness of the surrounding environment. In various embodiments, front surface 202 and/or back surface 204 of visor 200 may be shaped to provide an optical power for vision correction; in others, no such optical power shaping is included.

In some embodiments, visor 200 may further include an electrochromic or similar coating for altering the transparency of visor 200. The electrochromic layer may be formed on visor 200 and activated according to known methods in the art. For example, the electrochromic layer, in various embodiments, may be formed from one or more inorganic oxides such as, without limitation, tungsten oxide. Suitable inorganic oxides, in an embodiment, may react to electrical energy by moving charged particles from an ionic conductive layer in and out of one or more inorganic oxide layers, which results in changed light transmission properties. In other embodiments, suitable organic oxides may change light transmission properties as they undergo an oxidation reduction process in the presence of applied electrical energy. In still further embodiments, the electrochromic layer may include a cell of liquid crystal material loaded with a chromic dye. Of course, visor 200 may be provided with any other suitable layer of electrochromic material.

When activated by electrical energy, the electrochromic material may darken, thereby reducing the transparency of visor 200. In an embodiment, this feature may be used to promote enhanced visualization of the virtual image displayed by visor 200. In another embodiment, visor 200 may be darkened to a degree that mostly or completely obscures the wearer's view of the surrounding environment. Such an embodiment may be useful in virtual reality and gaming applications, for example, where the primary focus is on the displayed virtual images, and the wearer need not move or interact with the surrounding environment.

While the various body sections may be physically discrete from one another, they are formed or coupled in a way that gives the appearance of a visor 200 with a unitary body 208. The resulting visor may be substantially transparent without significant visible obstructions that may be noticed by the wearer or other persons looking at the wearer. Further, such a construction, with an internal reflective surface formed within the body of visor 200, allows for displaying a virtual image from within the plane of visor 200 itself, allowing visor 200—and by extension, frame 300—to be manufactured with minimal thickness and superior aesthetics, amongst other advantages.

Additional detail concerning these and other suitable configurations of virtual image visor 200 are provided for in U.S. patent application Ser. No. 14/610,930 entitled "Augmented Reality Eyewear and Methods for Using Same," filed Jan. 30, 2015, and in U.S. patent application Ser. No. 15/040,444 entitled "Lens for Displaying a Virtual Image," filed Feb. 10, 2016, each of which are incorporated by reference herein in their entirety for all purposes.

Image Projection System 400

Referring now to FIGS. 5A-5C and 6A-6C, in various embodiments of eyewear 100, visor 200 may be positioned in optical communication with image projection system 400. Image projection system 400 may include a light source 410 for emitting a light beam associated with an image to be displayed. In various embodiments, light source 410 may include, without limitation, an electronic visual display such as an LCD display, a front lit LCD, a back lit LCD display, said back lit display possibly lighted by natural or artificial light, such as, a man made light source, such as an LED, an OLED or organic light emitting diode display. Light source 410 may additionally or alternatively include a laser diode, liquid crystal on silicon (LCOS) display, cathodoluminescent display, electroluminescent display, organic light emitting diode (OLED) display, photoluminescent display, and incandescent display, amongst any other suitable devices. A driver 412 (shown later in FIGS. 11 and 12) may control light source 410 in producing real images.

Image projection system 400, in various embodiments, may further include one or any combination of optical elements such as a transform lens 420, a focusing lens 430, and an optical waveguide 440.

Transform optic 420, in an embodiment, may include a spatial light modulator or similar structure for modulating the intensity of the image light. In another embodiment, transform optic 200 may include a variable aperture for restricting the field of view of the image light. In yet another embodiment, transform optic 420 may include a magnifying optic.

Focusing lens 430 may serve to compensate for the short distance between the light source 410 and the user's eye by focusing the light beam such that the associated image may be readily and comfortably seen by the user. Focusing lens 430 may include any lens known in the art that is suitable for focusing the light beam (and thus, the corresponding image) emitted by light source 410, and may have a positive or negative power to magnify or reduce the size of the image. In an embodiment, focusing lens 430 may be tunable to account for variances in pupil distance that may cause the image to appear out of focus. Any tunable lens known in the art is suitable including, without limitation, an electroactive tunable lens similar to that described in U.S. Pat. No. 7,393,101 B2 or a fluid filled tunable lens similar to those described in U.S. Pat. Nos. 8,441,737 B2 and 7,142,369 B2, all three of which being incorporated by reference herein. Tunable embodiments of focusing lens 430 may also be tunable by hand or mechanical system wherein the force applied changes the distance in the lenses. In an embodiment, focusing lens 430 may include both static and dynamic focusing elements such as, without limitation, liquid crystal lenses, fluid lenses, or lens optics controlled with micro-motors or piezoelectric drivers. Embodiments in which focusing lens 430 is situated near light source 410 may have the benefit of focusing the image at the outset of its travel, thereby allowing focusing lens 430 to be tunable.

In various embodiments, collimator(s) 450 may be used to help align the individual light rays of the light beam. This can reduce image distortion from internal reflections. In doing so, collimator 450 may prepare the light beam in a manner that will allow the virtual image to appear focused at a far distance from the user or at infinity. Collimator 450 may also provide for the virtual image to be seen clearly from multiple vantage points. In an embodiment, collimator 450 may include any suitable collimating lens known in the art, such as one made from glass, ceramic, polymer, or some other semi-transparent or translucent material. In another embodiment, collimator 450 may take the form of a gap between two other hard translucent materials that is filled with air, gas, or another fluid. In yet another embodiment, collimator 450 may include a cluster of fiber optic strands that have been organized in a manner such that the strands reveal an output image that is similar to the image from light source 410. That is, the arrangement of strand inputs should coincide with the arrangement of the strand outputs. In still another embodiment, collimator 450 may include a series of slits or holes in a material, or a surface that has been masked or coated to create the effect of such small slits or holes. Of course, collimator 340 may include any device suitable to align the light rays such that the subsequently produced virtual image is focused at a substantial distance from the user.

Figure 5C:
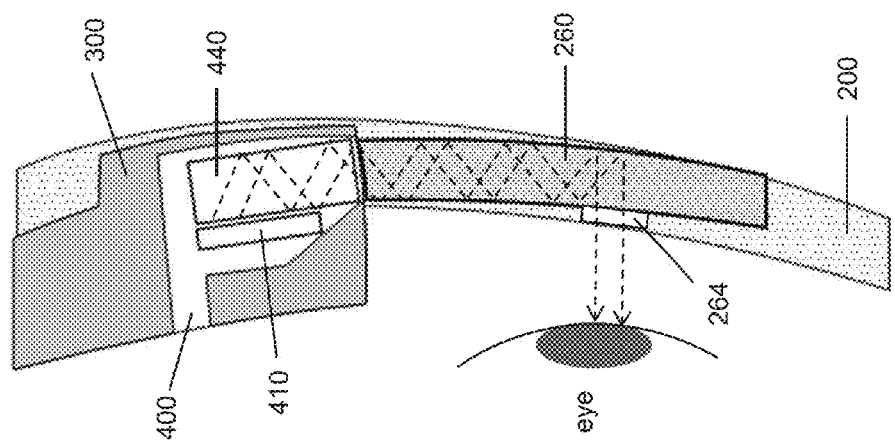
FIGS. 5A-5C depict schematic views of pathways along which image light may be directed downwards from an image projection system into virtual image visor of augmented reality eyewear, in accordance with embodiments of the present disclosure.
Figure 5B:
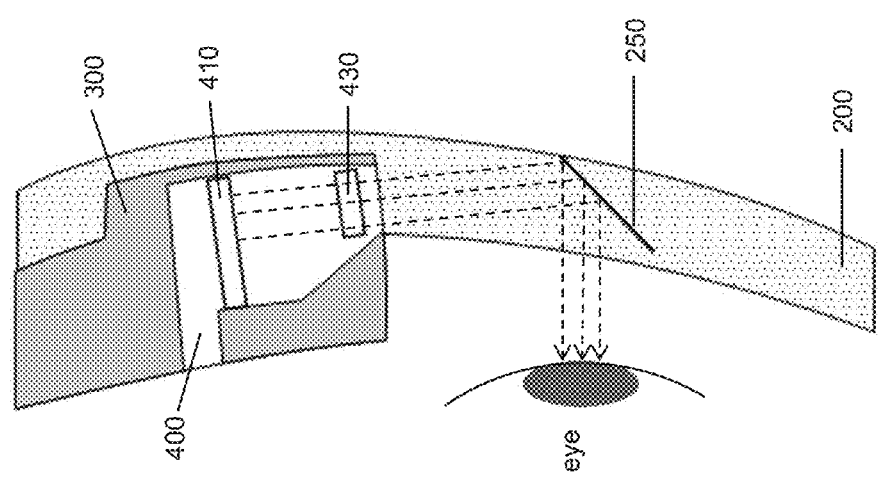
Figure 5A:
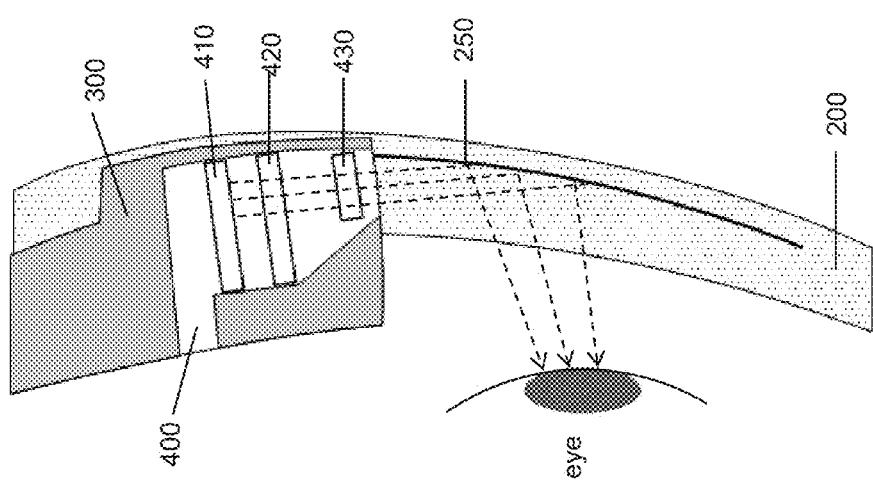

Referring now to FIGS. 5A-5C, in various embodiments of eyewear 100, visor 200 may be positioned in optical communication with image projection system 400 such that image light may be projected into the plane of lens 200, as schematically depicted by the dashed lines. In the embodiments shown, image projection system 400 is positioned above the wearer's eyes in a front portion of frame 300, and is configured to project image light downwards into visor 200. It should be recognized that embodiments of FIGS. 1A-1B, 2, and 3A-3B may be suitably configured to accommodate such an arrangement.

With reference first to FIG. 5A, an embodiment of visor 200 having a curved reflective surface 250 is shown in optical communication with an embodiment of image projection system 400 having a transform optic 420 and a focusing optic 430. In an embodiment, as shown, reflective surface 250 may have a concave curvature. Such a curvature, in some embodiments, may serve to both focus and reflect the light into a location in front of the wearer's eye where it can be readily viewed by the wearer. As depicted, image light is directed from light source 410, through transform optic 420 and focusing optic 430, and into visor 200. The image light continues along the plane of visor 200 towards curved reflective surface 250, where it is directed towards the wearer's eye for display as a virtual image.

With reference now to FIG. 5B, an embodiment of visor 200 having a flat and angled reflective surface 250 is shown in optical communication with an embodiment of image projection system 400 having a focusing optic 430. In an embodiment, as shown, reflective surface 250 may be relatively smaller and positioned at an angle towards the wearer's eye. The smaller, angled reflective surface may be substantially planar; in another embodiment (not shown), it may further be curved rather than planar to provide a focusing effect. Image light may be directed through an edge of lens 200 and transmitted through body section 230 toward reflective surface 250. As depicted, image light is directed from light source 410, through focusing optic 430, and into visor 200. The image light continues along the plane of visor 200 towards the angled reflective surface 250, where it is directed towards the wearer's eye for display as a virtual image. In some embodiments, a curved reflective surface 250 may provide for displaying wider and taller virtual images to the wearer, as opposed to a smaller, planar reflective surface.

With reference now to FIG. 5C, an embodiment of visor 200 having a virtual image pane 260 is shown in optical communication with an embodiment of image projection system 400 having waveguide 440. Image light introduced into virtual image pane 260 may reflect or refract one or more times between reflective surfaces 250a and 250b to transform the real image into a virtual image. The light may ultimately be directed out of virtual image pane 260 towards the wearer's eye through a coupling out optic 264.

It should be recognized that, additionally or alternatively, some or all of these optical elements (e.g., transform lens 420, focusing lens 430, optical waveguide 440, and collimating element 450) may be included within visor 200, rather than being part of image projection system 400 positioned between visor 200 and light source 410. In such embodiments, the optical elements may be embedded within visor 200 during manufacture or assembly thereof.

In an embodiment of FIG. 3B, light source 400 may be oriented laterally to direct light directly into lens 200. In another embodiment, image projection system 400 may be forward-facing, and project image light off of a reflective element to be directed laterally into lens 200. Of course any suitable optical element or series of optical elements may be provided for this purpose including, without limitation, a light guide or fiber optic element.

The relatively larger planform of a visor 200, as opposed to the smaller planform of individual lenses in spectacles, may provide for the use of larger and/or higher quality optical elements within visor 200. The resulting virtual image may be made larger and crisper, in some embodiments, relative to virtual images in spectacle-like embodiments. Further, eyewear 100 of the present disclosure may provide more real estate in frame 300 (e.g., helmet, thick frame of ski goggles, etc.) than that in a frame of spectacle-like embodiments. This in turn, may provide for the use of larger and/or higher quality optical elements in image projection system 400 and/or image capture system 500. The resulting virtual images or captured images may be made larger and crisper, in some embodiments, relative to those displayed or captured, respectively, in spectacle-like embodiments.

FIGS. 6A-6C depict alternative configurations of eyewear 100 in which image projection system 400 is configured to project image light sideways into visor 200, as schematically depicted by the dashed lines. It should be recognized that embodiments of FIGS. 1A-1B, 2, and 3A-3B may be suitably configured to accommodate such an arrangement. While not expressly shown and described, it should be recognized that, in other embodiments, image projection system 400 may additionally or alternatively be configured to project image light upwards into visor 200 in much the same way as described in the context of the embodiments of FIGS. 5A-5C.

While image projection system 400 is shown within frame 300, it should be recognized that image projection system 400 need not necessarily be directly coupled to frame 300. Instead, in some embodiments, image projection system 400 may be directly coupled with visor 200 and simply be housed within frame 300 without any substantial contact with frame 300. Such a configuration may prevent image projection system and visor 200 from becoming temporarily misaligned in the event frame 300 is torqued or otherwise impacted by external forces. In this way, frame 300 may flex around image projection system without affecting the position or orientation of image projection system 400 relative to visor 200.

In the specific context of spectacle-like embodiments of eyewear 100, it should be further noted that, while not necessarily limited in this manner, it may be preferable to house image projection system 400 in frame front 310 as opposed to in temples 320 for alignment purposes. Frame arms 320 may flex, making it more difficult to maintain alignment both within frame arm 320 itself, as well as across a juncture between frame arm 320 and frame front 310. Further, frame arms 320 may rotate about their hinges slightly during normal use, which would further complicate efforts to maintain optical alignment with image projection system 400 across said juncture.

Virtual images displayed by augmented reality eyewear 100 of the present disclosure will originate from within the plane of visor 200. Such an arrangement differs considerably from other display technologies in that the arrangement of the present invention has the optical elements completely contained within the ophthalmic lens and/or waveguide, and not necessarily attached to a frame front, end piece, or temple. For example, the ReconJet system by Recon Instruments, has a display placed in front of a lens that allows the wearer to see the image of said display in focus. And for example the Google Glass product, which is similar the ReconJet System, but that also requires an additional lens placed behind the optical system.

Frame 300, at least in part by virtue of the relatively slim-profile of visor 200 provided herein, may have similar lines, thickness, and appearance as ordinary ophthalmic eyewear, as compared to more bulky and potentially less-aesthetically-pleasing profiles associated with many other forms of virtual reality and augmented reality eyewear developed to date. This may facilitate social acceptance of augmented eyewear 100, as well as adoption by athletes needing lightweight and streamlined eyewear.

Image Capture System 500

Referring now to FIGS. 7A-7D, in various embodiments, eyewear 100 may utilize an image capture system 500 in combination with a collector 270 in visor 200 to capture images, video, and/or light readings from the surrounding environment. As configured, embodiments of the present disclosure may obviate the need for a forward facing camera, and hole(s) in frame 300 through which a lens of the image sensor 510 may protrude, that may otherwise be visible to others. In particular, collector 270 is utilized to collect ambient light from the surrounding environment through visor 200 and channels it towards image capture system 500, which may be hidden from view in frame 300. In this way, eyewear 100 may maintain the smooth, uninterrupted aesthetic appeal of conventional eyewear, while discretely capturing image data, as described in more detail below.

Figure 7A:
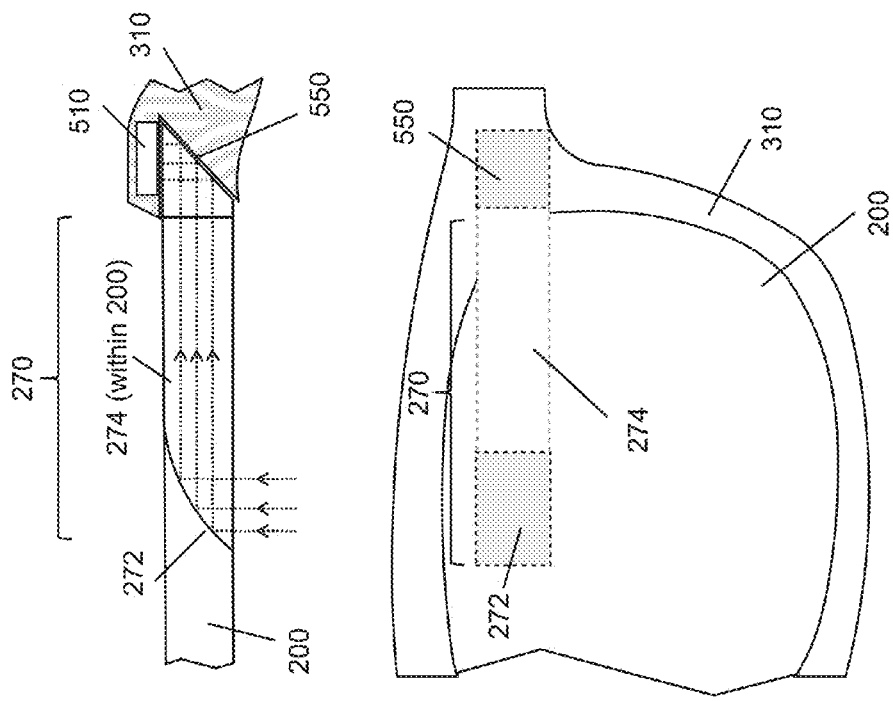
FIGS. 7A-7D illustrate schematic views of a collector and image capture system of augmented reality eyewear, in accordance with one embodiment of the present disclosure.
Figure 7B:
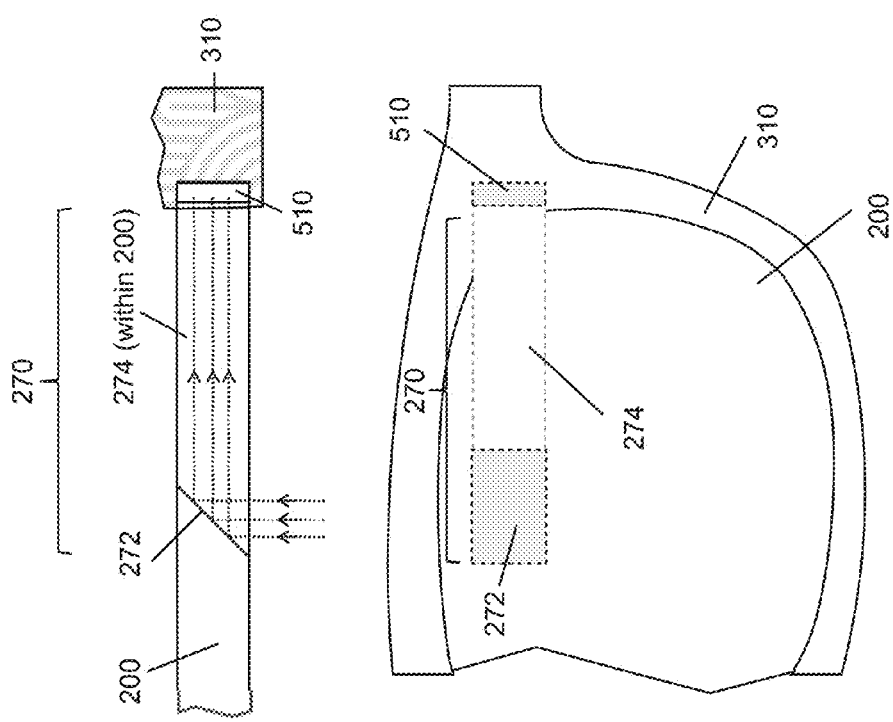

With reference first to FIGS. 7A and 7B, collector 270 of visor 200, in various embodiments, may generally include a reflective surface 272 and a pathway 274. Reflective surface 272 may be positioned and oriented within visor 200 to receive light from the surrounding environment and direct it along pathway 272 towards image capture system 500. Upon reaching an edge of visor 200, the light travelling along pathway 272 may exit visor 200 for capture by image sensor 510 of image capture system 500, as shown. In particular, in the embodiment of FIG. 7A, a substantially flat reflective surface 272 may be positioned in a central portion of visor 200 and oriented at a 45 degree angle towards image sensor 510, which is situated in frame front 310 of frame 300. As configured, light entering the front of visor 200 may be directed laterally within visor 200 by reflective surface 272 along pathway 274, where the collected light exits an edge of visor 200 and is captured by image sensor 510. In the embodiment of FIG. 7B, a curved reflective surface 272 may be positioned in a central portion of visor 200 and oriented such that its curvature directs light received through the front of visor 200 towards frame front 310. The particular curvature chosen for reflective surface 272 may be further defined to add focusing power, collimate, transform, or otherwise alter the light before it exits visor 200. In this manner, additional optical elements may not be necessary for these purposes. In other embodiments, one or more transforming element 520, focusing element 530, collimating element 540, or other suitable optical element of image capture system 500 (not shown) may be provided between image sensor 510 and visor 200 to manipulate the light as necessary before reaching image sensor 510. In various embodiments, transforming element 520, focusing element 530, collimating element 540 may be substantially similar in form and function as their counterpart in image projection system 400, and one of ordinary skill in the art will recognize suitable configurations in light of the present disclosure.

Image sensor 510, in various embodiments, may be positioned and oriented within frame 300 to directly receive light from collector 270, as shown in FIG. 7A. This may obviate the need for additional optical elements to vector light from visor 200 to image sensor 510. In other embodiments, as shown in FIG. 7B, image sensor 510 may instead by positioned away from the edge of visor 200 and at an orientation that does not face directly towards the edge of visor 200. For example, in FIG. 7B, image sensor 510 is positioned in an end piece of frame front 310 with a forward facing orientation. In such a configuration, image capture system 500 may comprise additional optical elements 550, such as the reflective surface shown, to vector the collected light from visor 200 to image sensor 510. Of course any suitable optical element or series of optical elements may be provided for this purpose including, without limitation, a light guide or fiber optic element. One of ordinary skill in the art will recognized desired configurations for given applications, and that certain configurations may provide for thinning and improving the aesthetics of certain sections of frame 300, in accordance with a desire of the teachings in the present disclosure.

Reflective surface 272, in various embodiments, may be substantially similar in construction and properties as reflective surfaces 250 and/or virtual image pane 260 used for displaying virtual images. In an embodiment, reflective surface 272 may be a reverse side of reflective surface 250. For example, referring back to FIG. 5B, the outer side of reflective surface 250 (facing away from the eye) may act as reflective surface 272, and direct light received through the front of visor 200 (coming from the right in the figure) towards an image sensor 510 at the bottom edge of the visor (located at the bottom of the figure).

In other embodiments, reflective surface 272 may instead be a separate and distinct optical element from that used in connection with displaying virtual images. Any other suitable construction, positioning, and orientation of reflective surface 272 suitable for receiving and directing light entering the front of visor 200 along pathway 274 is envisioned within the scope of the present disclosure. Pathway 274, in various embodiments, may be abstract and defined by a portion of the visor body itself. In other embodiments, pathway 274 may be defined by an optical element such as a wave guide situated within visor 200.

Figure 7C:
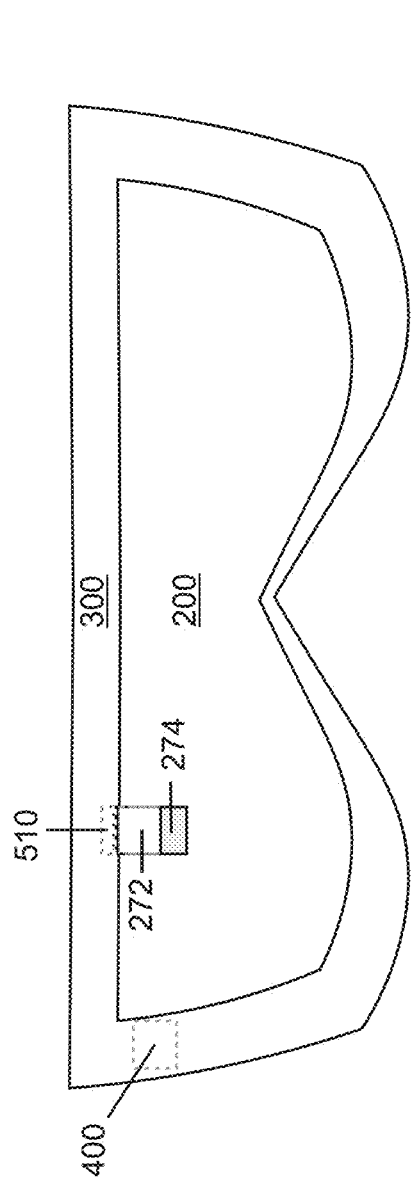
Figure 7D:
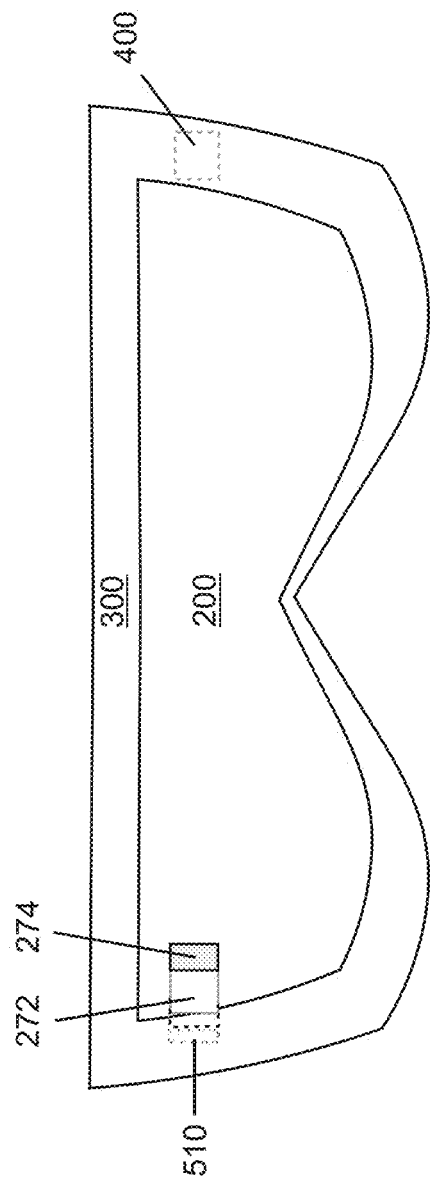

FIGS. 7C and 7D depict further representative configurations of eyewear 100 configured for capturing image data in this manner. Generally speaking, collector 270 in visor 200 may be placed in optical communication with image sensor 510, which may be located in frame 300. As shown in FIG. 7C, in an embodiment, image sensor 510 may be located in frame 300 above visor 200. As configured, collector 270 may be oriented vertically within visor 200 in this example to vector collected light upwards towards image sensor 510. As shown in FIG. 7D, in another embodiment, image sensor 510 may be located in side portion of frame 300. As configured, collector 270 may be oriented horizontally within visor 200 in these examples to vector collected light laterally towards image sensor 510. Of course, these are merely illustrative examples of suitable locations and orientations of image sensor 510 and collector 270, and the present disclosure is not intended to be limited as such. Further, as shown in FIG. 4E, eyewear 100 may include multiple image sensors 510 and collectors 270 in any suitable number and arrangement.

Electronics 600 and Packaging within Frame 300

Referring now to FIGS. 8A-8D, 9A-9B, and 10A-10C, eyewear 100 may further include electronics 600 for controlling the display of virtual images to the wearer, and if equipped, for controlling image capture system 500. In various embodiments, electronics 600 may accomplish this alone, or alternatively, in combination with a companion device 110 such as a smart phone. Electronics 600, in various embodiments, may include any number of suitable components and/or devices suitable for the above-stated purpose. Representative examples include, but are not limited to, microprocessors 610, memory devices 620, and transceivers 630.

As shown in FIGS. 8A-8D, 9A-9B, and 10A-10C, electronics 600, in various embodiments, may be provided on one or more printed circuit boards (PCB) 640 and connected thereon by PCB electrical connectors 642. PCB 640 may be shaped and sized to accommodate a desired form factor of frame 300. In various embodiments, PCB 640 may be rigid, flexible, or have some portions that are flexible and others that are rigid, in order to accommodate desired levels of rigidity/flexibility in corresponding frame components. PCB 640 may further be single- or multi-layered. One or more of the example electronics 600, such as microprocessor 610, memory 620, transceiver 630, may be included on and connected to one another on PCB 640 by PCB electrical connections 642 (not shown) known in the art. In some embodiments, these PCB connections 642 may serve to route electrical power to electronics 600 on PCB 640. Additionally or alternatively, PCB connections 642 may provide for communication of information between electronics 600 situated on PCB 640. Arrangement of electronics 600 on PCB 640 may allow for robust connectivity between electronics 600, as well as streamlined packaging of electronics 600 within frame 300. In other embodiments, electrical connectors 644, such as traces, may additionally or alternatively be deposited onto internal surfaces of frame 300 such that they contact electronics 600 situated therein and provide similar connectivity at with PCB 640. These streamlined approaches to connecting electronics 600 within frame 300 can allow for eyewear 100 to be made with a thinner profile and aesthetically pleasing lines similar to those of conventional eyewear. Of course, such power and/or data transfer functionality may be accomplished via other methods known in the art, and the present disclosure is not intended to be limited only to those illustrative embodiments described above.

Frame 300, in addition to its role in supporting visor 200 in front of the wearer's eyes, may further serve to house and protect electronics 600 of eyewear 100. In some embodiments, components of frame 300 may be pre-formed, and configured with cavities or other features to accommodate electronics 600 therein. In some embodiments, electronics 600 may be installed within the pre-formed components of frame 300 during the assembly process. Additionally or alternatively, the pre-formed components of frame 300 may be configured such that electronics 600 may be inserted into and removed from frame 300 by the wearer. As configured, the wearer, in an embodiment, may be able to swap in and swap out electronics 600, as desired for a given application. In other embodiments, components of frame 300 may be formed about electronics 600, such that electronics 600 are embedded as an integral part of the ultimately formed frame component.

Integral constructions in which frame 300 is formed about electronics 600 so as to embed electronics 600 therein may provide for a thinner, more streamlined, and aesthetically pleasing frames 300 as compared to those assembled from pre-formed components. Further, integral constructions may serve to improve durability and reduce noise from loose and rattling components.

Representative materials from which the frame 300 components may be formed include, but are not limited to, metal, glass, acetates, animal by-product such as horn or shell, plastics, composites, naturally-occurring material such as stone or wood, or any suitable combination thereof. In various embodiments, components may be constructed of plastic may be formed via injection molding or extrusion, and those constructed of acetates, glass, metals and plastics could be formed via thermal forming processes known in the art. Metal components may additionally or alternatively be constructed via stamping or machining.

FIGS. 8A-8D depict representative embodiments of frame temple 320 of frame 300 with electronics 600 situated or embedded therein. In the illustrated examples, electronics 600 of temple 320 are arranged on PCB 640. Here, a rigid casing 324 is provided about PCB 640, and one or more outer shells 322 are further situated about the encased PCB 640, as shown. Outer shells 322, casing 324, or a combination thereof may be constructed to provide a water-resistant or water-proof seal about PCB 640 and any electronics thereon, as well as to provide structural support to temple 320.

Temples 320 may further include one or more buttons 660 or other interactive interfaces through which the wearer may provide manual input to electronics 600 in eyewear 100, as shown in FIG. 8B. For example, button 660 may be a power button for turning eyewear 100 on and off. Button 660 may additionally or alternatively serve to enable the wearer to alter the mode, brightness, or other features of the virtual display in visor 200. One of ordinary skill in the art will recognize other suitable interfaces and associated functionality within the scope of the present disclosure.

Temples 320 may further be provided with one or more external electrical connectors 650 configured to electrically couple the electronics of temple 320 with electronics 600 situated in other components of frame 300, such as those in frame front 310. As shown in FIG. 8B, external electrical connector 650 may be provided on an inward-facing surface of temple 320. Such an electrical connector 650 may couple with a complementary external electrical connector 650 located in frame front 310. As shown in FIGS. 13A-13C and later described, such a configuration may also serve to electrically couple electronics 600 in both temples 320 via a crossover electrical connection in a rimless embodiment of eyewear 100. As shown in FIGS. 8C and 8D, external electrical connector 650, in an embodiment, may alternatively extend from an end of temple 320 and interface with a complementary external electrical connector in end piece 312 of frame front 310. Additionally or alternatively, external electrical connectors 650 may be configured to electrically couple embedded electronics 600 with peripheral devices located outside of frame 300 (not shown).

Figure 9A:
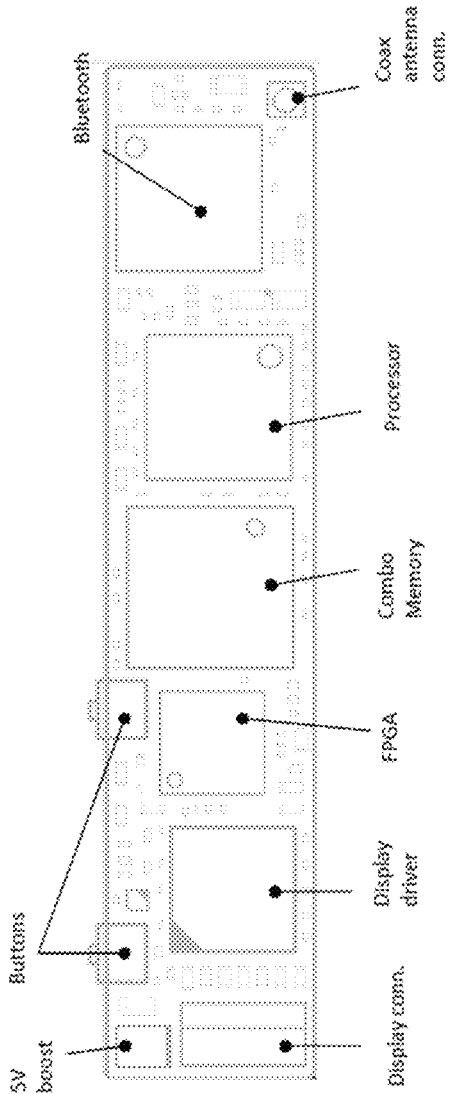
FIGS. 9A and 9B illustrate an example frame temple PCB board, in accordance with embodiments of the present disclosure.
Figure 9B:
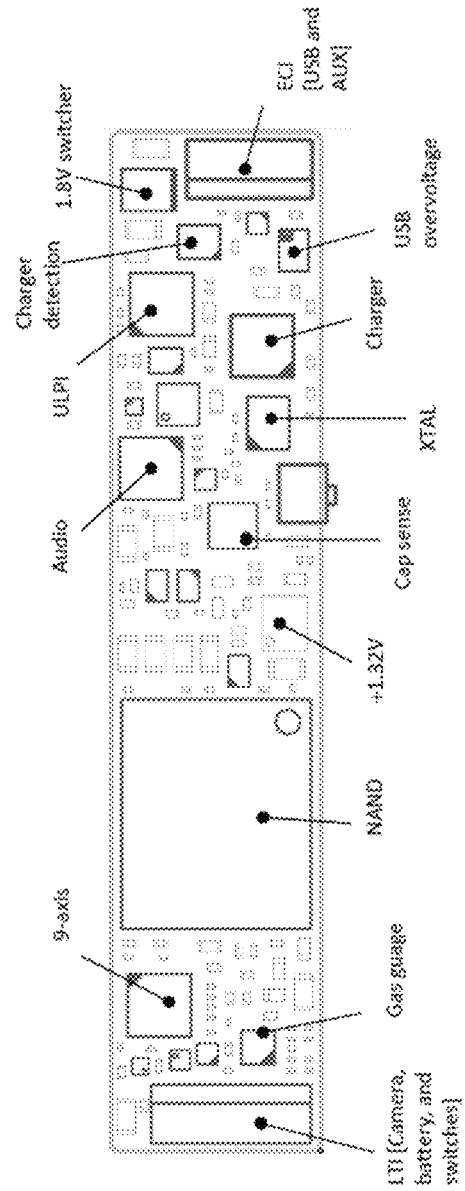

FIGS. 9A-9B depict a representative layout of electronics 600 on PCB 640. The lefthand side of PCT 640 as illustrated corresponds with the front end of temple 320 (i.e., the end that connects to frame front 310) and the righthand side corresponds with a rear end of temple 320 (i.e., the portion proximate the wearer's ear). FIG. 9A depicts a top layer section of PCB 640 (positioned proximal to the wearer's head) and FIG. 9B depicts a bottom layer section (positioned distal from the wearer's head). The top layer section includes electronics associated with image projection system 400, along with microprocessor 610, memory device 620, and transceiver 630. The bottom layer section include electronics associated with image capture system 500, power supply, and peripheral inputs, amongst others. Of course, FIGS. 9A and 9B depict only one of several suitable arrangements of electronics 600 on PCB 640, and the present disclosure is not intended to be limited only to the configuration shown.

Figure 10C:
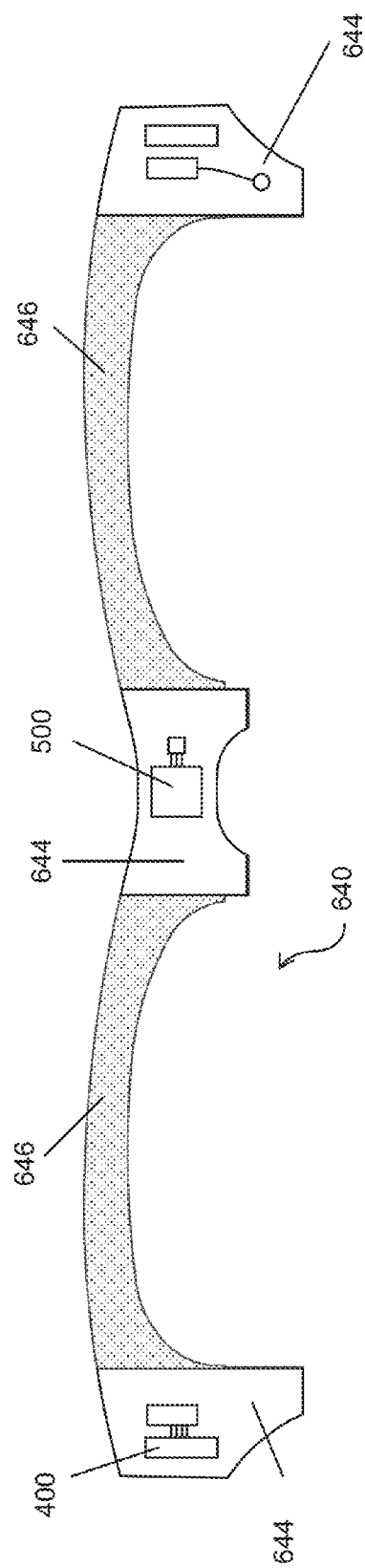

FIGS. 10A-10C depict a representative embodiment of frame front 310 of frame 300 with electronics 600 situated or embedded therein. In the illustrated examples, electronics 600 of frame front 310 are arranged on PCB 640. Here, one or more outer shells 316 are situated about PCB 640 and the associated electronics 600 thereon. Outer shells 316 in an embodiment, may provide structural support to frame front 310, serve to protect PCB 610 and electronics 600 from physical impact and/or damaging elements. Frame front 310 may be constructed to provide a water-resistant or water-proof seal about PCB 640 and electronics 600 thereon.

Various electronics 600 on PCB 640 of frame front 310 may be connected by PCB electrical connections 642. In the representative example shown, PCB 640 provides connections 642 for electrically coupling light source 400 and image sensor 420, as shown in FIG. 10A. In some embodiments, these PCB connections 642 may serve to route electrical power amongst electronics 600 in frame front 310 from a power source. Additionally or alternatively, these PCB connections 642 may provide for the communication of information between light source 400 and image sensor 510. For example, light readings taken by image sensor 420 may be communicated directly to light source 400 via PCB connections 642 for use in automatically determining an appropriate brightness level of the image light projected by light source 400 for the surrounding ambient light conditions. Of course, such power and/or data transfer may be accomplished without PCB 640 via other methods known in the art, and the present disclosure is not intended to be limited only to the illustrative embodiments described above.

Referring now to FIG. 10C, PCB 640 of frame front 310, in an embodiment, may have portions that are flexible and others that are rigid. In the example shown, PCB 640 may be rigid in portions 644 configured for supporting light source 400 and/or camera 420, and flexible in remaining portions 646. The rigid portions 644 may provide for maintaining sufficient alignment of light source 400 and camera 420 with reflector 250 in visor 200. The remaining portions 646 of PCB 640, which do not have a significant impact on the alignment of these optical elements, may be flexible so as to provide for enhanced comfort and durability. Further, PCB 640 may be constructed with flexible sections 646 to allow for eyewear 100 to be adjusted to the wearer's face, both for correct placement of any correcting optics as well as correct placement of reflective surface 250 for proper positioning of the virtual image in the wearer's field of vision.

As previously described, components of frame 300 such as frame front 310 and temples 320 may be formed about electronics 600, such that electronics 600 are an integral part of the ultimately formed frame 300 components. Referring back to the representative temples 320 of FIGS. 8A-8D and 9A-9B, outer shells 322 may be laminated or molded over PCB 640 and any electronics 600 situated thereon such that these electronics 600 are embedded within the ultimately formed temple 320. This may provide for a thinner, more streamlined, and aesthetically pleasing temple 320. Temple 320, in some embodiments, may be manufactured according to the following process. Electronics 600 maybe potted with thermally-conductive water-resistant compounds and then laminated or bonded to a two piece frame temple shell. In some embodiments each half of the shell construction may be the same material and in other embodiments one half may be made of a different material. For example metal on one half facing outward to act a heat sink for the electronics, while the internal half facing the wearer might be plastic to insulate the heat from the wearers face. In other embodiments the electronics 600 may be built up onto bus work that is printed on one or more internal surface of the temple shell assembly. In still other embodiments the electronics 600 and connectors 550 may be over molded in a secondary molding process.

Similarly, referring again to FIGS. 10A-10C, outer shells 316 may be laminated or molded over PCB 640 and any electronics situated thereon such that those electronics 600 are embedded within the ultimately formed frame front 310. Additionally or alternatively, shell elements of frame front 310 may be printed with connections 642 for electrically coupling embedded electronics 600. This may provide for a thinner, more streamlined, and aesthetically pleasing frame front 310. In various embodiments, Of course, these are merely example fabrication materials and techniques, and one of ordinary skill in the art will recognize other suitable fabrications.

Figure 11:
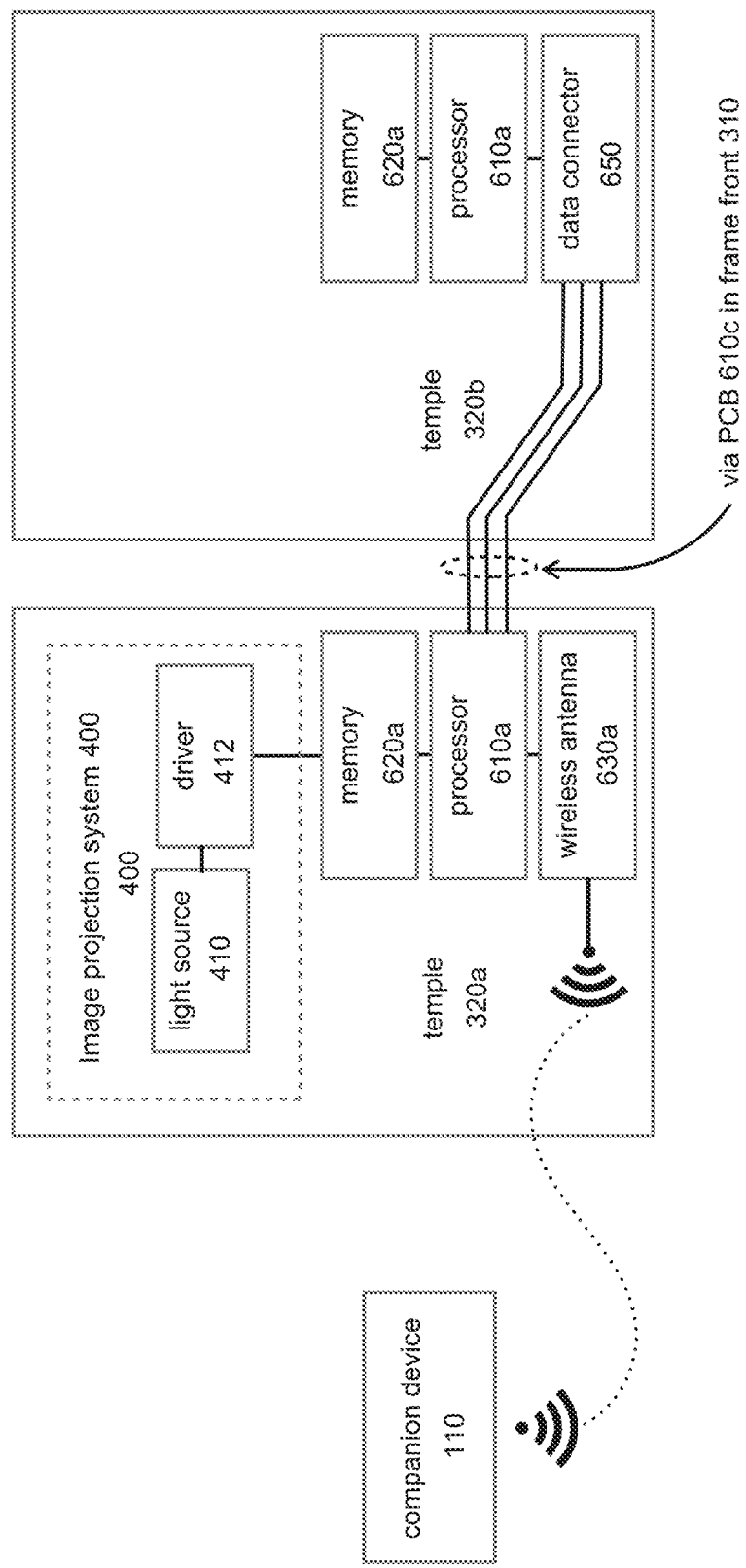
FIG. 11 schematically illustrates electrical communication between electronics of frame temples, in accordance with an embodiment of the present disclosure.

FIG. 11 depicts an embodiment of frame 300 in which the electronics 600a, 600b of temples 320a, 320b, respectively, are electrically coupled with one another through frame front 310 via wired connection. In the embodiment shown, temples 320a, 320b and frame front 310 include external electrical connectors 650 that electrically couple PCBs 640a, 640b in temples 320a, 320b with PCB 640c in frame front 310. In this way, electronics 600a, 600b, and/or 600c in temples 320a, 320b and/or frame front 310 may communicate with one another via wired connection. Additionally or alternatively, such a wired connection may allow for various electronics 600 distributed throughout frame 300 to draw power from a common power source(s).

In the example configuration of FIG. 11, each temple 320a and 320b may be equipped with processors 610a, 610b, and memory 620a, 620b, respectively. Temple 320a may further include a wireless antenna 630a for communication with a companion device 110 (if equipped), as well as light source 400. Temple 320b may further include a data connector 650 configured to interface with the wired connection provided across frame front 310 for sending and/or receiving data from processor 610a in temple 320a.

Figure 12:
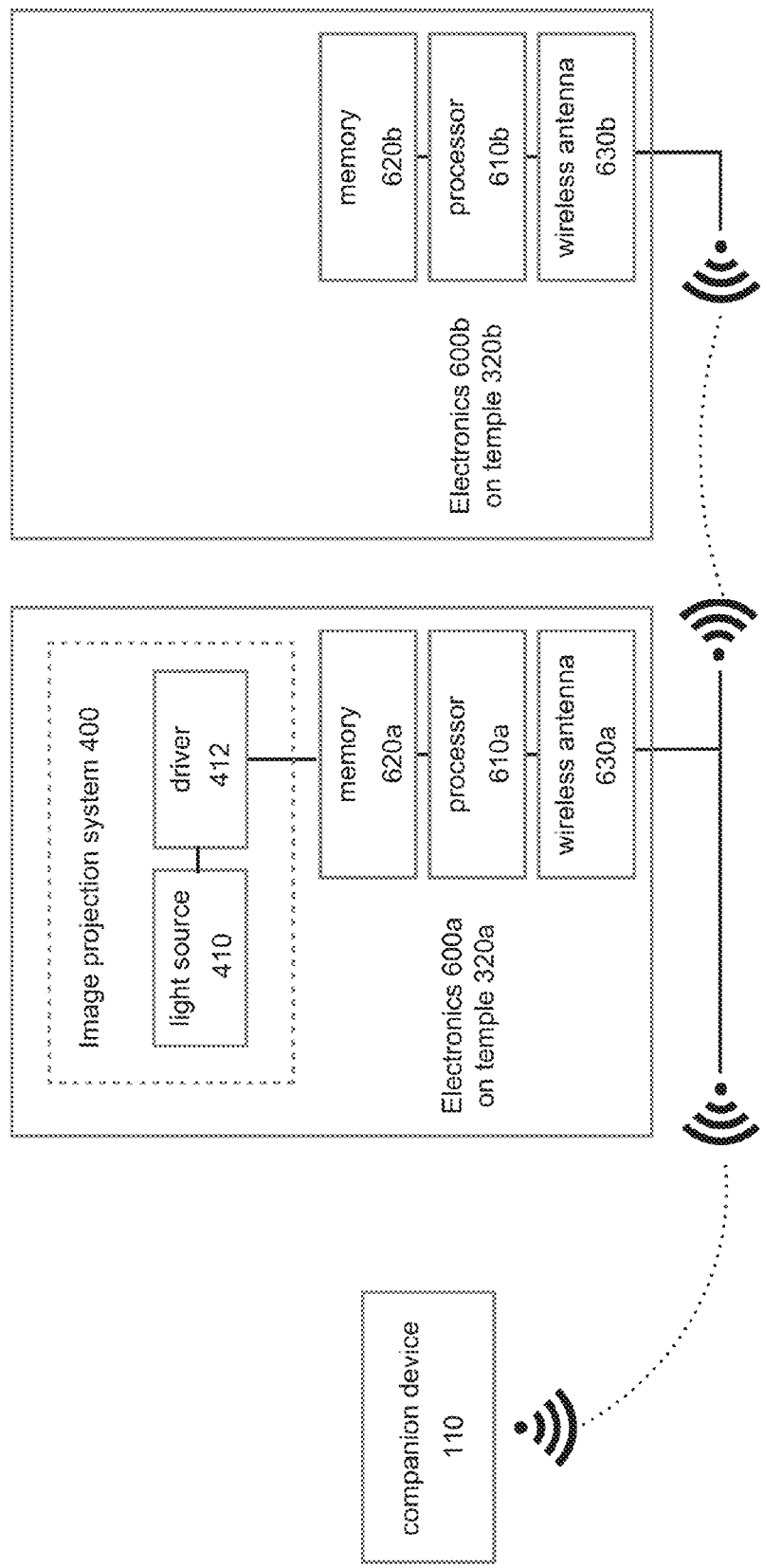
FIG. 12 schematically illustrates wireless communication between electronics of frame temples, in accordance with an embodiment of the present disclosure.

FIG. 12 depicts an embodiment of frame 300 in which the electronics 600a, 600b of temples 320a, 320b communicate with one another wirelessly. Here, temple 320a may be configured in a substantially similar manner as corresponding temple 320a of FIG. 11, but temple 320b of the present example may include a wireless antenna 630b configured to communicate wirelessly with wireless antenna 630a of temple 320a, as shown. Any suitable wireless communications technology is envisioned such as, without limitation, WiFi, Bluetooth, ZigBee, or near-field communications (NFC) technologies.

It should be recognized that, in some embodiments (not shown), a wired connection between temples 320*a* and 320*b* may be provided in addition to the wireless connection. Such an optional wired connection may, in an embodiment, be configured for routing power amongst electronics 600. In another embodiment, the optional wired connection may additionally or alternatively route certain data exchanges, whilst others are reserved for wireless transmission. This may simplify data exchange and save battery power in some embodiments.

By providing power and/or communications connections amongst some or all of electronics 600, real estate and weight distribution within frame 300 may be optimized, thereby allowing eyewear 100 to be well-balanced on a wearer's face and maintain a thin profile with aesthetically pleasing lines. Further consideration may be given to modularity in determining an appropriate distribution of electronics 600 throughout frame 300. In particular, in some embodiments, it may be desirable to package certain electronics into the same temple 320, such that the entire temple (and the electronics contained within it) can be swapped out with another temple having different electronics, depending on the particular application for which eyewear 100 is to be used at a given time.

FIGS. 13A-13C and 14 depict embodiments of augmented reality eyewear 100 having the look and feel of conventional rimless spectacles.

In the embodiment of FIGS. 13A-13C, electronics 600*a*, 600*b* located in temples 320*a*, 320*b* of rimless eyewear 100 may be connected by a crossover connection 560 (e.g., ribbons, wires, traces) that is routed over or behind visor 200, as shown in FIG. 13A. For structural rigidity and/or aesthetic concerns, crossover connection 560 may be supported along its path over or behind visor 200 by a rigid material 565, as shown in FIGS. 13B and 10C. In particular, with reference to FIG. 13B, rigid material 565 may surround crossover connection 560 in an embodiment. Such a construction may provide maximum protection to crossover connection 560 as it extends between electronics 600*a*, 600*b* of temples 320*a* and 320*b*. In another embodiment, as shown in FIG. 13C, crossover connection 560 may be positioned against visor 200, and held there against by rigid material 565. Such a configuration may effectively cover and protect electrical connector from impact or damage from the elements. Of course these are merely illustrative embodiments, and any other suitable construction that securely supports and protects electrical connector 650 is envisioned within the scope of the present disclosure.

In the embodiment of FIG. 14, electronics in temples 320*a* and 320*b* may communicate via wireless antennae 630*a*, 630*b* without having to make design concessions to jump wires or electrical traces across the front of the eyewear. This may be accomplished using a similar architecture as that previously described in the context of FIG. 12.

It should be recognized that larger embodiments of frame 300, such as the helmet of FIGS. 1A and 1B, may provide greater space for accommodating electronics as compared to the goggle and temple frames of FIGS. 2 and 3A, 3B. Further, helmet-like embodiments may provide for wired connection between electronics 600 situated throughout the helmet, without having to be routed through a frame front section. Efficient and streamlined packaging of electronics 600 may still prove beneficial; however, may not be of as critical concern. It should be recognized that helmet-like embodiments, as well as any other embodiments providing relatively greater space for electronics 600 and connectivity therebetween, may still benefit from an include streamlined packaging of electronics 600.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. Eyewear for displaying a virtual image, the eyewear comprising:
a visor lens for placement in a field of vision of a wearer of the eyewear;
a light source in optical communication with an edge of the visor lens and configured to project light into the visor lens through the edge of the visor lens; and
a reflective surface situated within the visor lens, and configured to direct the light projected into the visor lens from the light source toward at least one eye of the wearer for display as a virtual image.

2. Eyewear as set forth in claim 1, wherein the visor lens is shaped to have a corrective power for correcting vision of the wearer.

3. Eyewear as set forth in claim 1, wherein the visor lens comprises a first body section and a second body section, the first and second body sections being coupled to form an internal interface within the visor lens.

4. Eyewear as set forth in claim 3, wherein the reflective surface is situated along the internal interface within the visor lens.

5. Eyewear as set forth in claim 1, wherein the reflective surface focuses the light at a location beyond the reflective surface.

6. Eyewear as set forth in claim 1, wherein the reflective surface has a concave curvature.

7. Eyewear as set forth in claim 1, wherein the reflective surface is planar.

8. Eyewear as set forth in claim 1, wherein the reflective surface is angled to direct the light projected into the visor lens towards the one or both eyes of the wearer.

9. Eyewear as set forth in claim 1, wherein multiple reflective surfaces are arranged within the visor lens to form a light guide.

10. Eyewear as set forth in claim 9, wherein the multiple reflective surfaces are configured such that the light reflects or refracts off of each of the reflective surfaces one or more times before being directed towards one or both eyes of the wearer.

11. Eyewear as set forth in claim 1, further comprising at least one of a transform optic, a focusing optic, an optical waveguide, and a collimating optic embedded within the visor lens.

12. Eyewear as set forth in claim 1, further comprising at least one of a transform optic, a focusing optic, an optical waveguide, and a collimating optic situated between the light source and the visor lens.

13. Eyewear as set forth in claim 1, wherein the light source is oriented towards the edge of the visor lens.

14. Eyewear as set forth in claim 1, further comprising an optical element for directing the light from the light source towards the edge of the visor lens.

15. Eyewear as set forth in claim 1, further comprising an image sensor configured to capture at least one of images, video, and light readings from an ambient environment.

16. Eyewear as set forth in claim 15, further comprising a second reflective surface in the visor lens configured to direct ambient light from the surrounding environment through the visor lens and towards the image sensor.

17. Eyewear as set forth in claim 1, wherein the image sensor is absent direct optical communication with an area in front of the eyewear.

18. Eyewear as set forth in claim 17, wherein the second reflective surface is a reverse side of the reflective surface configured to redirect light projected into the visor lens from the light source toward the at least one eye of the wearer for display as a virtual image.

19. Eyewear for displaying a virtual image, the eyewear comprising:
   a visor lens configured to display a virtual image in a field of vision of a wearer of the eyewear;
   a frame for supporting the visor lens within the field of vision of the wearer; and
   electronics for operating the eyewear, the electronics being integrally embedded within one or more components of the frame.

20. Eyewear as set forth in claim 19, wherein the electronics are arranged on one or more printed circuit boards.

21. Eyewear as set forth in claim 19, wherein the one or more frame components in which the electronics are integrally embedded includes one or more shells molded over the integrally embedded electronics.

22. Eyewear as set forth in claim 19, wherein the one or more components in which the electronics are integrally embedded includes one or more shells laminated onto the integrally embedded electronics.

23. Eyewear as set forth in claim 19, wherein the frame is a spectacles frame.

24. Eyewear as set forth in claim 23, wherein the electronics are integrally embedded within the first temple and the second temple.

25. Eyewear as set forth in claim 24, wherein the integrally embedded electronics in the first temple are in wireless communication with the integrally embedded electronics in the second temple.

26. Eyewear as set forth in claim 23, wherein the integrally embedded electronics in the first temple are in electrical communication with the integrally embedded electronics in the second temple.

27. Eyewear as set forth in claim 26, wherein the electrical communication extends through a frame front of the spectacle frame.

28. Eyewear as set forth in claim 26, wherein the frame is rimless, and electrical communication extends through a crossover electrical connection.

29. Eyewear as set forth in claim 19, wherein the one or more components of the frame containing integrally embedded electronics are configured for modular coupling with the other components of the frame.

30. Eyewear as set forth in claim 19, wherein the frame is a goggles frame.

31. Eyewear as set forth in claim 19, wherein the frame is a helmet.

* * * * *